US008894485B2

(12) United States Patent
Caldas et al.

(10) Patent No.: US 8,894,485 B2

(45) Date of Patent: Nov. 25, 2014

(54) ELECTRONIC GAMING SYSTEM WITH ROM-BASED MEDIA VALIDATION

(71) Applicants: Marius Caldas, Ellijay, GA (US); Marc McDermott, Lawrenceville, GA (US); Ian Scott, Duluth, GA (US); Ted Ohnstad, Johns Creek, GA (US)

(72) Inventors: Marius Caldas, Ellijay, GA (US); Marc McDermott, Lawrenceville, GA (US); Ian Scott, Duluth, GA (US); Ted Ohnstad, Johns Creek, GA (US)

(73) Assignee: Cadillac Jack, Inc., Duluta, GA (US)

(*) Notice: Subject to any disclaimer, the term of this patent is extended or adjusted under 35 U.S.C. 154(b) by 81 days.

(21) Appl. No.: 13/845,980

(22) Filed: Mar. 18, 2013

(65) Prior Publication Data

US 2014/0274364 A1 Sep. 18, 2014

(51) Int. Cl.

*A63F 13/00* (2014.01)

*G07F 17/32* (2006.01)

(52) U.S. Cl.

CPC .................................. *G07F 17/3241* (2013.01)

USPC ............... 463/29; 463/43; 713/189; 713/190; 713/191; 713/193

(58) Field of Classification Search

CPC ..... G07F 17/3241; G06F 21/51; G06F 21/57; G06F 21/575; G06F 21/64; G06F 21/10; G06F 21/12; G06F 21/121; G06F 21/44; G06F 2211/008; H04L 9/3263; H04L 9/3268; H04L 63/0823; H04L 9/3247; H04L 63/0428

USPC ............................... 463/29, 43; 713/189–193

See application file for complete search history.

(56) References Cited

U.S. PATENT DOCUMENTS

| | | | | |
|---|---|---|---|---|
| 2004/0248646 | A1* | 12/2004 | Canterbury | 463/29 |
| 2006/0020821 | A1* | 1/2006 | Waltermann et al. | 713/189 |
| 2006/0100010 | A1* | 5/2006 | Gatto et al. | 463/29 |
| 2009/0024854 | A1* | 1/2009 | Fukasawa | 713/189 |
| 2009/0245520 | A1* | 10/2009 | Chang et al. | 380/279 |
| 2010/0048296 | A1* | 2/2010 | Adiraju | 463/29 |
| 2010/0178977 | A1* | 7/2010 | Kim et al. | 463/25 |
| 2012/0179917 | A1* | 7/2012 | Yach et al. | 713/189 |
| 2012/0266259 | A1* | 10/2012 | Lewis | 726/30 |

* cited by examiner

*Primary Examiner* — Justin Myhr

(74) *Attorney, Agent, or Firm* — CF3; Stephen Eisenmann

(57) ABSTRACT

Examples disclosed herein relate to systems and methods for validating the authenticity of one or more media associated with a gaming system. The systems and methods may utilize a public key in association with a ROM-based algorithm to validate such media. The systems and methods may: decrypt the encrypted game assets media signature; determine a verified game assets hash signature from the decrypted game assets media signature; determine a game assets verification range from the decrypted game assets media signature; calculate a game assets hash signature based on the game assets verification range; and/or determine if the game assets verified hash signature matches the game assets calculated hash signature.

14 Claims, 13 Drawing Sheets

ELECTRONIC GAMING SYSTEM WITH ROM-BASED MEDIA VALIDATION

FIELD

The subject matter disclosed herein relates to an electronic gaming system and method of configuring an electronic gaming system. More specifically, the disclosure relates to ROM-based media validation system and method, and associated gaming system configurations.

INFORMATION

The gaming industry has numerous casinos located both worldwide and in the United States. A client of a casino or other gaming entity can gamble via various games of chance. For example, craps, roulette, baccarat, blackjack, and electronic or electromechanical games (e.g., a slot machine, a video poker machine, and the like) where a person may gamble on an outcome.

Historically, electronic gaming systems comprise a significant portion of a casino offering, and are therefore very important to the industry. However, as with many electronic systems, security concerns may need to be addressed. Due to the nature of electronic gaming systems, and their ability to accept and award high levels of money, it may be important that an operator can trust that the game and media running on an electronic gaming system is authentic, and not malware and/or other exploitable game. Additionally, due to the importance of electronic gaming systems, it is also important that any associated security systems not require significant down time, as an electronic gaming system needs to be usable by a player for the casino to recognize value from it.

SUMMARY

The disclosure relates to systems and methods for validating the authenticity of one or more media associated with a gaming system. The systems and methods may utilize a public key in association with a ROM-based algorithm to validate such media. The systems and methods may: decrypt the encrypted game assets media signature; determine a verified game assets hash signature from the decrypted game assets media signature; determine a game assets verification range from the decrypted game assets media signature; calculate a game assets hash signature based on the game assets verification range; and/or determine if the game assets verified hash signature matches the game assets calculated hash signature.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
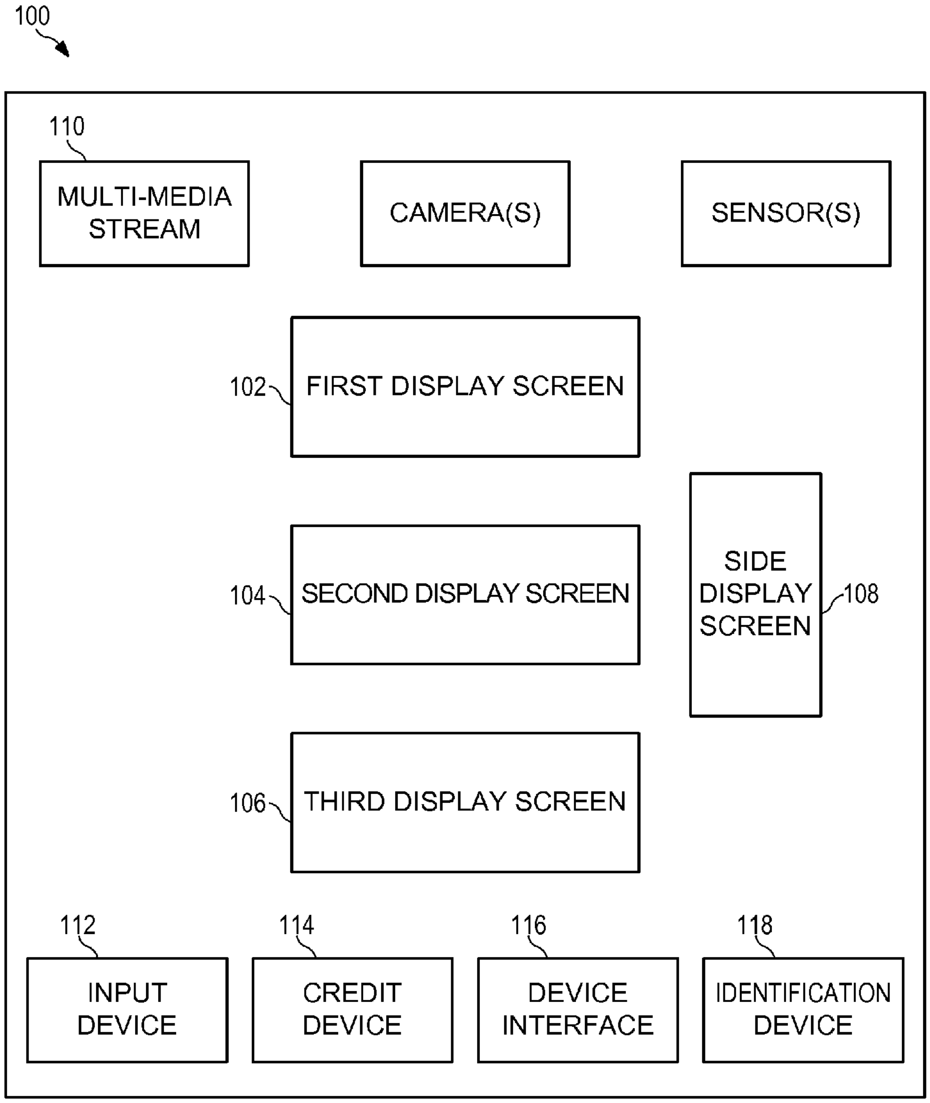
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to game security, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
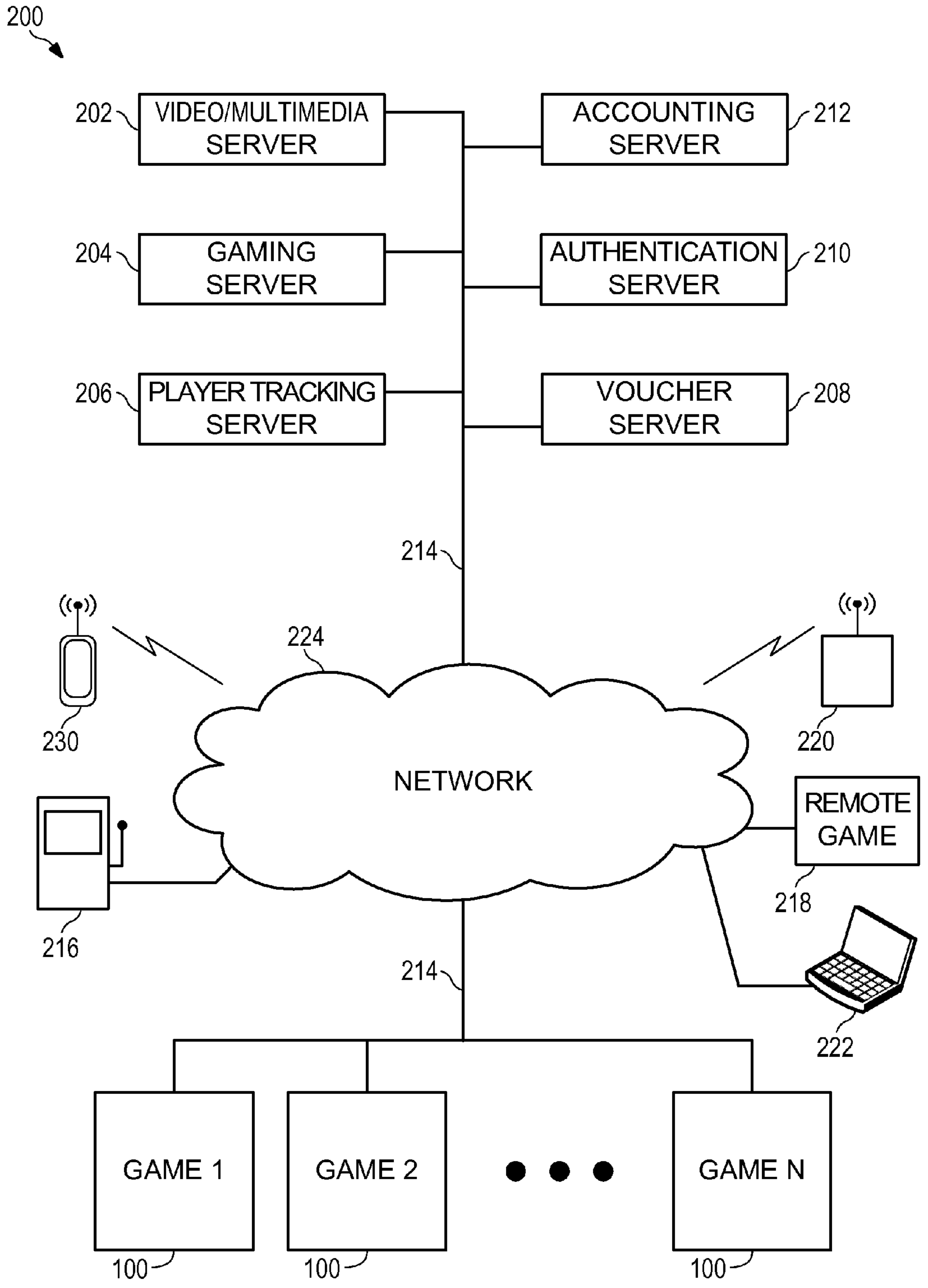
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
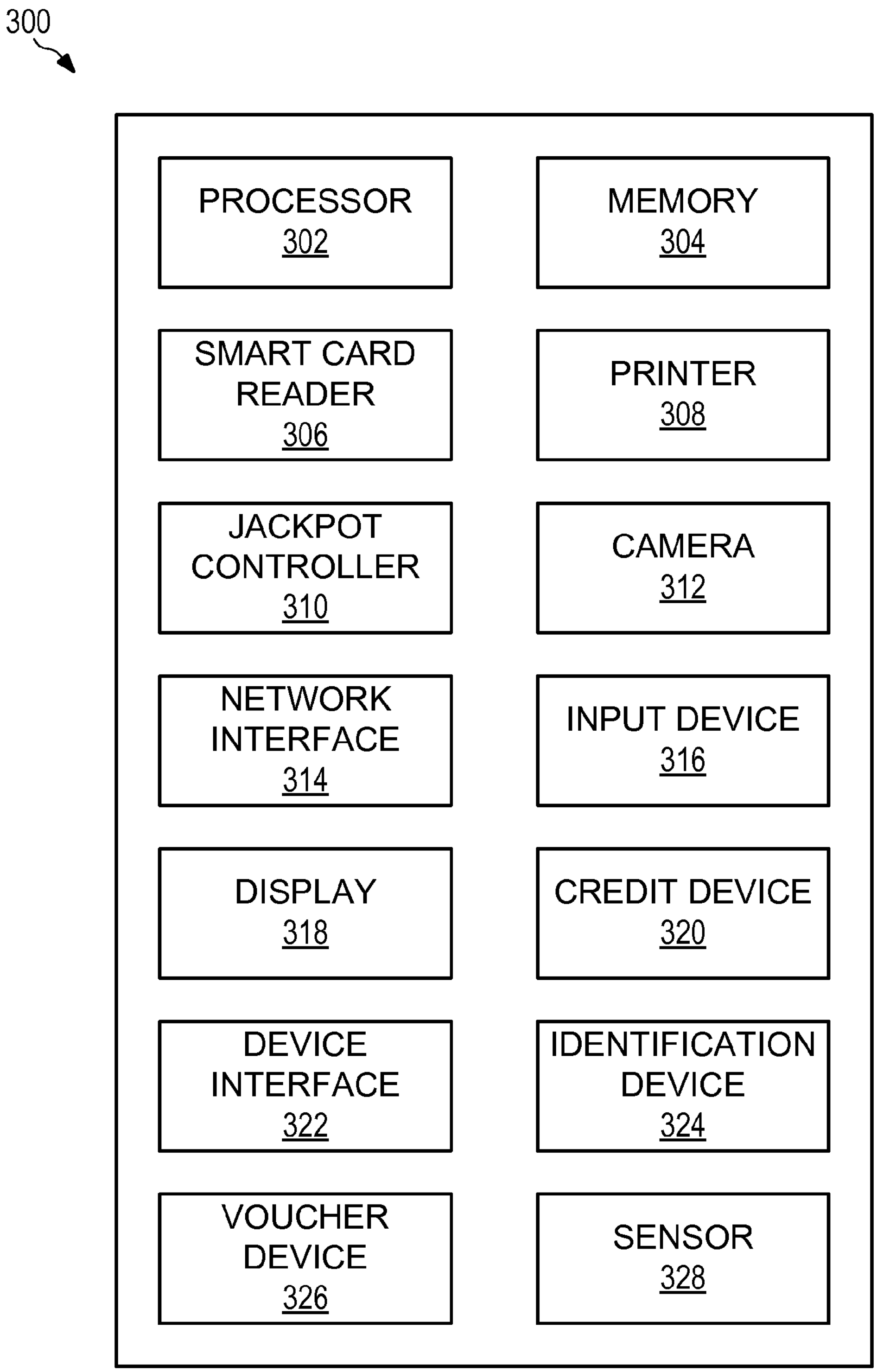
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
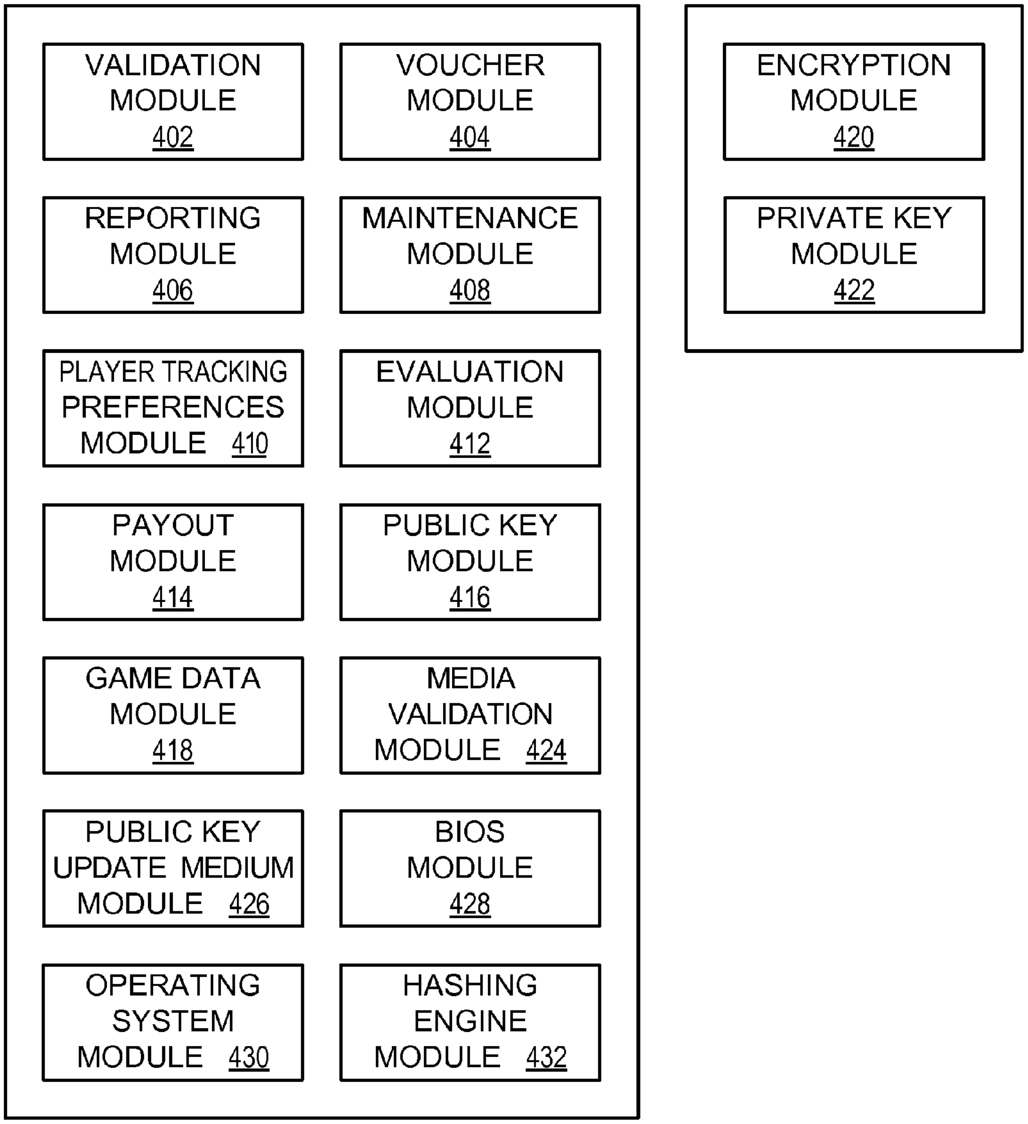
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a public key module 416, a game data module 418, a media validation module 424, a public key update medium module 426, a BIOS module 428, an operating system module 430, and a hashing engine module 432. Further an encryption module 420 and a private key module 422 may interact with one or more elements of memory 304.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events relating to game play.

Payout module 414 may determine one or more payouts which may relate to one or more inputs received from the player, electronic gaming device 100, and/or electronic gaming system 200.

Public key module 416 may be utilized to schedule software task (e.g., every 500 milliseconds) whose purpose is to check the validity of Public Key 510 (e.g., by calculating a checksum for Public Key 510 and comparing it with a previously calculated value (e.g., at the time the Public Key 510 was originally assigned/stored) that is separately stored (perhaps in Game Data 515 and/or in EEROM on the motherboard or in RAM 540)). If a discrepancy is discovered, it could then trigger a "System Error." Public key module 416 may be a decryption module (e.g., 845, 1014, and 1106). Public key module 416 may be checksum calculations (e.g., CRC-16 or CRC-32, which stand for Cyclic Redundancy—715 and 820).

Game data module 418 may include data associated with the game and/or game play. This data may be stored in read-only and read/write memory devices. One example of "game data" is data that has to survive a power-hit (e.g., credits on the machine, so this value has to be stored in non-volatile memory (such as BATRAM)).

Encryption module 420 may include data relating to one or more encryption process and/or procedures.

Private key module 422 may include data relating to the private key.

Media validation module 424 may validate one or more devices and/or elements (e.g., Game and Assets 640, etc.). In another example, BIOS extension 815 may also validate one or more devices and/or elements.

Public key update medium module 426 may include data entirely contained within "Sector 0" (e.g., element 680). In one embodiment, "Sector 0" 680 may not adhere to the traditional first sector format/layout-rather, it is a custom block of 512 (or fewer) bytes intended for this specific purpose. Since the encrypted public key may be entirely contained within this 512 bytes, there may be no need for a partition entry/table- and the "data partition" 690 may be utilized for other purposes.

Further, PKUM 675, in another embodiment, one in which the Public Key Update data will not entirely fit within the 512 bytes of the first sector 680 may follow the traditional first sector format/layout (see 601), and "Partition Entry #1" 605B serves the role of their explicit/separate "Partition Table" for locating the Data Partition 690 containing the Public Key. (The vast majority of 690 will in fact may be unused since the Public Key Update data may be quite tiny in size by comparison-at most one, two, or possibly four sectors (2,048 bytes) versus about 1,953,125 sectors for a 1 GB compact flash.

In another example, the module may be responsible for reading the compact flash 675, validating the Public Key Update data, and/or writing it to the BATRAM/SRAM 510.

BIOS module 428 may be a Basic Input/Output System. In one example, a read-only-memory and/or Flash (programmable) memory chip on the motherboard may contain a set of microprocessor instructions for Power-On-Self-Test ("POST"), initializing input and output hardware components, and loading an operating system and/or other program from a mass storage device (e.g., compact flash, hard disk, CD drive, diskette drive, or USB drive). Upon reset and/or power-on, the microprocessor outputs a preset memory address (known as its "reset vector"); located at this address is an instruction to "jump" to the BIOS entry point, upon which the microprocessor will begin executing the BIOS code.

In another example, one of the things the BIOS does is called the Power-On-Self-Test ("POST"), which initializes and tests various parts of the computer (e.g., it's own checksum; video card; RAM; keyboard; PCI card(s); etc.). In another example, the BIOS is programmed to boot an operating system from a location (e.g., diskette, hard drive, CD-ROM, USB, and/or a network). This may be user-configurable and/or fixed. In another example, the BIOS does not understand file systems (such as FAT, NTFS, ext4, etc.)—it only knows how to read the first sector on a mass storage device. The first sector ("Sector 0" 605) is typically 512 bytes and is known as the Master Boot Record ("MBR") and may contain three sections; (1) a tiny (typically 446 bytes) bootstrapping program at the start of the MBR; (2) a "partition table" for the mass storage device; and (3) a MBR "signature". (See FIG. 6D reference number 601 for a breakdown).

The bootstrapping program at the start of the MBR could be a DOS loader, a Windows loader, a Linux loader, etc. Unlike the MBR bootstrap code 605A, the MBR's partition table is standardized. (See FIG. 6D reference numbers 601/605B-605E and 602). In various example, reference numbers (e.g., 845, 850, 930, 935, 940, 945, 951, 1014, 1016, and 1102-1108) may include information stored in an active partition entry (e.g., See FIG. 6D reference numbers 602, 607F, 607B, 607D, and/or 607E) may be needed to locate their Media Signature (e.g., 630 and 665), and to calculate the hash over a start/stop range (Alternatively they may elect to "hard-code" the sector(s) in the MBR bootstrap code 605A). The BIOS and BIOS extension 815 has to access 610, 640, and 675 by sector (and/or by CHS-cylinder/head/sector-see 607B and 607D).

This bootstrapping program at the start of the MBR may be a first stage-due to its size; the code in the MBR does just enough to load another sector from disk that contains additional bootstrap code. This sector might by the boot sector for a partition, but could also be a sector that was hard-coded into the MBR bootstrap code 605A when the MBR was installed. The additional MBR bootstrap code just loaded may then read a file containing the second stage of the boot loader (see 615). It then (optionally) reads a boot configuration file, either presenting choices to the user and/or simply goes ahead and loads the kernel/operating system.

At this point the boot loader 615 needs to load kernel 619; it must know about file systems to read the kernel file from the disk. It reads the monolithic, contiguous file containing the kernel into memory and then jumps to the kernel's entry point.

Operating system module 430—once loaded and started may further initialize the EGM hardware and then load its "init" program, which starts the system configuration. The Media Validator ("MeV") may be invoked at the end of the system configuration phase.

Hashing engine module 432 may be utilized in combination with MeV and/or to validated one or more elements and/or devices (e.g., 610, 640, 675, etc.). The hashing may be implemented in accordance with FIPS 180-4. In one example, once the Public Key Module 416 has decrypted the Media Signature to reveal a start location and a stop location (See FIG. 6A reference numbers 604D, 604A, 608A, and 606A; FIG. 6B reference numbers 604B, 608B, and 606B; and FIG. 6C reference numbers 604C, 606C, and 608C), the method may be implemented. During the hashing process, the start location, the direction to go, and when to stop may be needed. For example, FIG. 6B shows the start location as being location 0 of sector 0 (each sector is 512 bytes). Blocks of bytes are consumed by the hash algorithm in increasing byte/sector order (608) until the stop location (inclusive) is reached. "Padding" is added at the end as needed to fulfill the m-bit block size of the hash algorithm.

In one example, a sector size of 512 bytes may be an even multiple of several hash algorithms (SHA-1 for example). In this example, the "stop location" may be sector number 1,123,456 and in this sector only three bytes by be utilized-then they must zero-fill (and/or any other method) to "pad" the entire sector. In this example, this may be because the granularity of a start location and a stop location is at a sector level—i.e., 512 bytes—and not at a byte level.

In one example, the process of "signing" a read-only-memory ("ROM") integrated circuit, a Compact Flash ("CF") card, a hard disk, and/or any other digital mass storage device may include the signer enters a room with controlled (restricted) access. In one example, for security purposes, the number of person(s) authorized to access this room may be intentionally small (e.g., one, two, or three persons), and a list of person(s) so authorized may be known (made available) to the gaming control board (e.g., Nevada). The room may be under 24 hour video surveillance.

In one example, a single, "stand alone" PC is present in this room, one without any external network connectivity (wired or wireless, inter- or intranet), and no serial or parallel port connections (e.g., a PC, a keyboard, a video monitor, and a mouse).

In one example, the signer possess a mass storage device (such as: a diskette; a CD-ROM; a USB thumb-drive; etc.) containing the "image" to be signed. The PC is used to read this image and "hash it" (i.e., calculate a SHA-1 for example, SHA meaning "secure hash algorithm") according to Federal Information Processing Standards (FIPS) publication 180-4 (see FIPS PUB 180-4 Federal Information Processing Standards Publication Secure Hash Standard (SHS) March 2012). In the case of SHA-1, this calculation produces a 160-bit (20-byte) hexadecimal number referred to as the "message digest," which is a unique, condensed representation of the original image.

In one example, the message digest of this image is permanently recorded. Further, this message digest of this image may be made known to the Gaming Control Board (e.g., Nevada, etc.) so they may verify images while in the field. In another example, the message digest—optionally along with other pertinent information (e.g., a start and stop location)—may then be encrypted using an Asymmetric Key Encryption algorithm. In one example, the Private Key is known only to the signer (and it must not leave the PC) while the Public Key may be distributed in the field as part of the Electronic Player System (gaming machines). In one example, at this point the signer may leave the room. Since the PC has no outside connectivity, the encrypted information from step five must somehow be manually conveyed with him, perhaps by diskette or USB thumb-drive. This encrypted "media signature" is then made part of the image (e.g., making it the last- or next to last-sector in the image's medium) before it can be released to QA, Production, and eventually find its way into the field.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5:
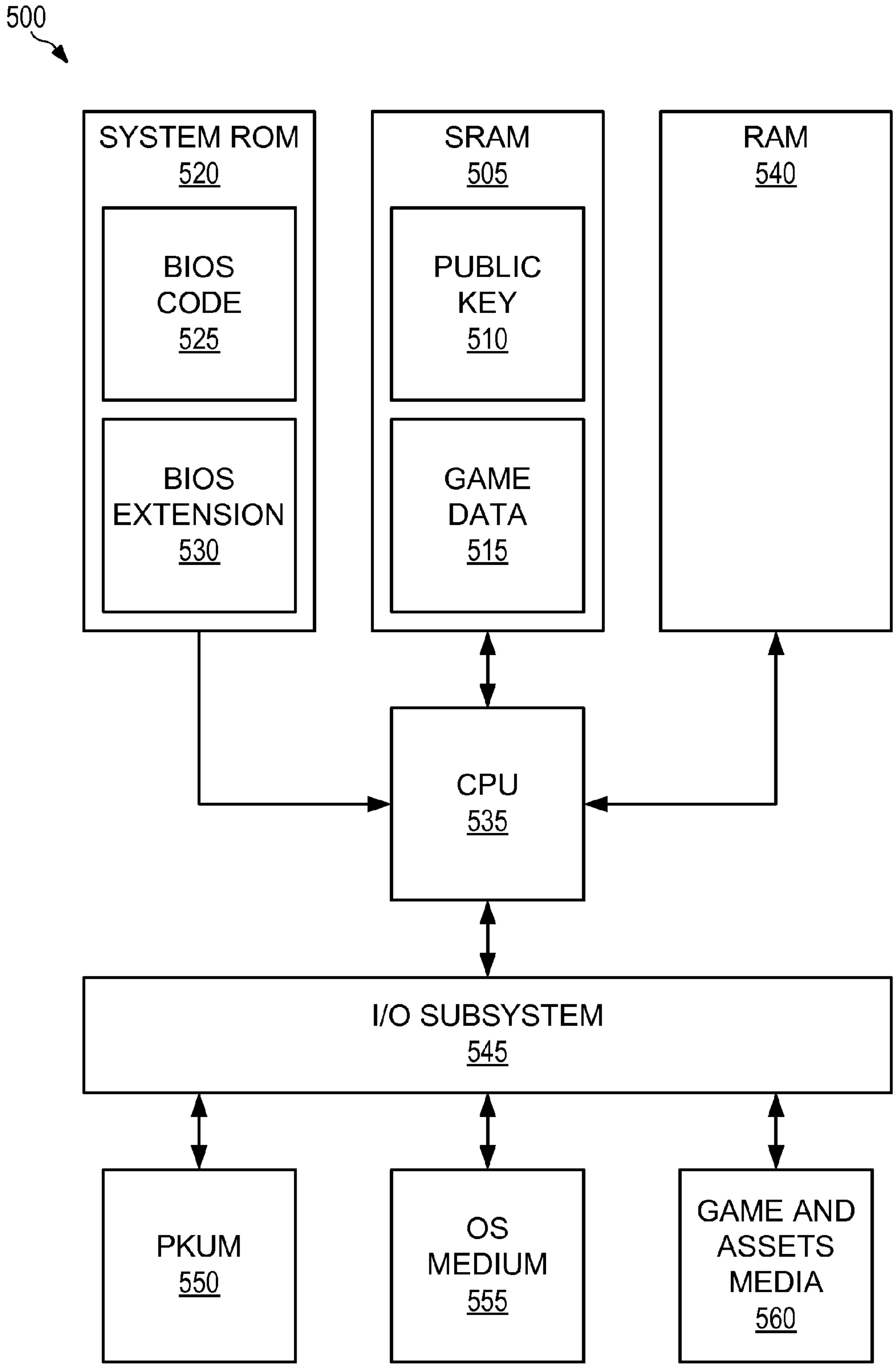
FIG. 5 is a diagram illustration of an exemplary gaming system, according to one embodiment.

FIG. 5 is a diagram illustration of an exemplary gaming system, according to one embodiment. Specifically, FIG. 5 illustrates components that may be included with a gaming system, generally shown at 500. Gaming system 500 is illustrated as a dashed line as it is contemplated that one or more components illustrated therein may be physically located remote from one or more other components. However, for illustration purposes, exemplary components are illustrated in FIG. 5 as being located within a single enclosure. Further, it should be appreciated that FIG. 5 illustrates various components in a diagrammatic view, and individually identified components may be comprised of several distinct components, and that FIG. 5 is only meant to illustrate a simplified configuration for purposes of explanation.

Gaming system 500 may have one or more central processing units ("CPU") 535. CPU 535 may include one or more processors. CPU 535 may be hardware, and may be configured to carry out instructions received from one or more memory devices and/or one or more blocks of programs stored on one or more memory devices.

CPU 535 may communicate with a read/write memory device, such as a static random-access memory ("SRAM") 505. In one embodiment, SRAM 505 may include one or more battery devices which may prevent data corruption due to an occurrence of an out-of-tolerance condition. In one embodiment, SRAM 505 may store public key 510 which may be used, as discussed more below, for media validation. In another embodiment, SRAM 505 may include game data 515. In one example, game data 515 may include persistent game data. In another example, game data 515 may include other persistent data.

CPU 535 may communicate with system Read Only Memory ("ROM") 520. In one embodiment, system ROM 520 may include Basic Input/Output System ("BIOS") code 525. In one embodiment, BIOS code 525 may include that the first instructions CPU 535 is configured to execute upon a power on and/or reset event. In one example, BIOS code 525 may include instructions for initializing one or more components of gaming system 500.

System ROM 520 may also store a BIOS extension 530. In one embodiment, BIOS extension 530 may be configured to allow CPU 535 to produce a calculated signature, as discussed more fully below, based on a sector and/or sectors of media used to store data. In one embodiment, it is contemplated that utilization of a BIOS extension 530 for ROM-based media validation may provide particular advantages. For example, an associated motherboard may only allow a limited number of address lines, which may further limit the size of an associated ROM to ROM socket. In another example, such an address space limitation may be further complicated due to a large BIOS code size. In a further example, a file-by-file verification algorithm, which may require file-system logic to be included in BIOS code, may also need additional initialization routines and/or kernels to be included as well, which may greatly increase the associated file size. In one embodiment, sector input/output routines are readily available within BIOS code 525. In a further embodiment, BIOS extension 530 may be comprised of such sector input/output routines. In another embodiment, BIOS extension 530 may be configured to, as discussed more fully below, determine one or more sectors of an operating system medium and the calculation of an associated signature.

CPU 535 may communicate with additional read/write memory devices, such as Random Access Memory ("RAM") 540. RAM 540 may include event data and/or other data generated and/or used during a play of a particular game.

CPU 535 may also communicate with an Input/Output ("I/O") subsystem 545. I/O subsystem 545 may manage and/or coordinate communications between CPU 535 and various other components, which may include one or more media devices. I/O subsystem 545 may coordinate activities between CPU 535 and I/O subsystem 545. I/O subsystem 545 may map external I/O processing requirements into the basic functionality of the I/O subsystem 545. I/O subsystem 545 may also manage concurrent processing activities within the I/O subsystem 545 itself.

I/O subsystem 545 may communicate with a Public Key Update Medium ("PKUM") 550. In one embodiment, and as discussed more fully below, PKUM 550 may include instructions which may be utilized to update public key 510. In another embodiment, PKUM 550 may not be in full-time communication with I/O subsystem 545, but rather, and as discussed more fully below, may be requested to be placed in communication by CPU 535 if it is determined that public key 510 needs to be updated. In one example, the data received and/or transmitted by PKUM 550 may be encrypted. In another example, the data received and/or transmitted by PKUM 550 may not be encrypted. Any of the data transmitted and/or received by any device may be encrypted, may not be encrypted and/or any combination thereof.

In one embodiment, it may be particularly beneficial to store public key 510 on a memory device which more easily allows updating (e.g., SRAM 505) as opposed to another location which may be more difficult to update (e.g., system ROM 520 and/or BIOS code 525). It is contemplated that in this manner, it may be easier to change, update, or otherwise correct the public key. For example, placing PKUM 550 in communication with gaming system 500 may be a quick and easy way to update public key 510, without requiring the replacement of the more complicated and sensitive system ROM 520 and/or BIOS code 525.

I/O subsystem 545 may also communicate with Operating System ("OS") medium 555, and/or game and assets media 560. I/O subsystem 545 may utilize such communication to facilitate validation of OS medium 555 and/or game and assets media 560.

Figure 6A:
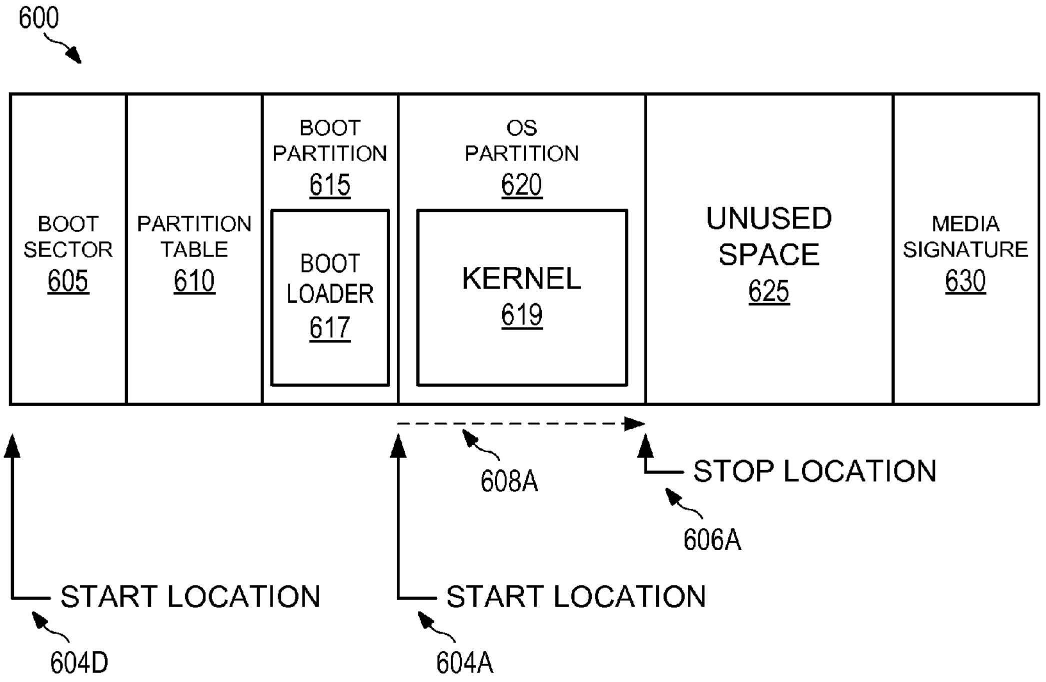
FIG. 6A is a diagram illustration of an exemplary memory layout, according to one embodiment.
Figure 6B:
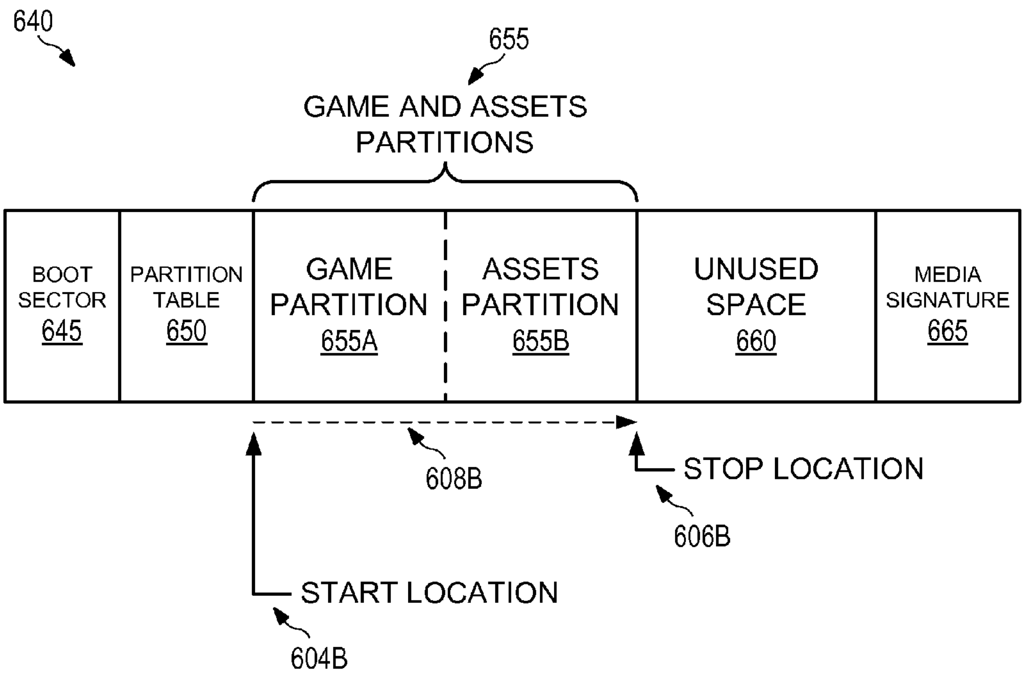
FIG. 6B is another diagram illustration of an exemplary memory layout, according to one embodiment.

FIG. 6A is a diagram illustration of an exemplary memory layout, according to one embodiment. In one embodiment, FIG. 6A may be the layout of an OS medium 600. In a further embodiment, OS medium 600 may be flash memory. For example, OS medium 600 may be a compact flash ("CF") memory. In another example, OS medium 600 may be a Solid State Drive ("SSD").

In another embodiment, OS medium 600 may be viewed as a continuous array of sectors. In a further embodiment, an identified partition may include one or more sectors. In one example, OS medium 600 may include at the front end a boot sector 605. Boot sector 605 may contain code which may allow a CPU to boot the OS medium 600 and load the associated programming. OS medium 600 may then include partition table 610. Partition table 610 may include instructions for the allocation and/or identification of partitions within OS medium 600. OS medium 600 may next include an OS partition 620. OS partition 620 may include instructions related to the loading and/or running of an associated OS. OS medium 600 may also include unused space 625. In one embodiment, any unused space 625 may be located after the last indexed partition (e.g., OS partition 620). In another embodiment, any unused space 625 may be located just before a media signature 630.

Media signature 630 may be located at the end of OS medium 600. In one embodiment, locating media signature 630 at the end of OS medium 600 may provide an advantage to authenticating OS medium 600 because an associated BIOS and/or BIOS extension may be configured to only look at the end of OS medium 600 for media signature 630, which in turn may increase associated system security and efficiencies. Media signature 630 may be encrypted. In one embodiment, media signature 630 is encrypted by use of a public-key cryptography system. For example, media signature 630 may be encrypted by use of an Asymmetric Key Encryption ("AKE") algorithm. One possible AKE algorithm may be the RSA algorithm, but it is contemplated that other AKE algorithms are well-known for public-key cryptography systems, and each such algorithm may be utilized in accordance with various embodiments herein. In one embodiment, a private key may be utilized to encrypt media signature 630. In another embodiment, a public key (e.g., public key 510 of FIG. 5) may be utilized to decrypt media signature 630. In one example, once media signature 630 is decrypted, it may be utilized, as discussed more fully below, to authenticate OS medium 600.

FIG. 6B is a diagram illustration of an exemplary memory layout, according to one embodiment. In one embodiment, FIG. 6B may be the layout of game assets media 640. In a further embodiment, game assets media 640 may be flash memory. For example, game assets media 640 may be a compact flash ("CF") memory. In another example, game assets media 640 may be a Solid State Drive ("SSD").

In another embodiment, game assets media 640 may be viewed as a continuous array of sectors. In a further embodiment, an identified partition may include one or more sectors. In one example, game assets media 640 may include at the front end a boot sector 645. Boot sector 645 may contain code which may allow a CPU to boot the game assets media 640 and load the associated programming. Game assets media 640 may then include partition table 650. Partition table 650 may include instructions for the allocation and/or identification of partitions within game assets media 640. Game assets media 640 may next include a game assets partition 655. Game assets partition 655 may include instructions related to the loading and/or running of game assets to provide a game. For example, game assets may include paytables and/or game executables. Game assets media 640 may also include unused space 660. In one embodiment, any unused space 660 may be located after the last indexed partition (e.g., game assets partition 655). In another embodiment, any unused space 660 may be located just before a media signature 665.

Media signature 665 may be located at the end of game assets media 640. In one embodiment, locating media signature 665 at the end of game assets media 640 may provide an advantage to authenticating game assets media 640 because an associated BIOS and/or BIOS extension may be configured to only look at the end of game assets media 640 for media signature 665, which in turn may increase associated system security and efficiencies. Media signature 665 may be encrypted. In one embodiment, media signature 665 is encrypted by use of a public-key cryptography system. For example, media signature 665 may be encrypted by use of an Asymmetric Key Encryption ("AKE") algorithm. One possible AKE algorithm may be the RSA algorithm, but it is contemplated that other AKE algorithms are well-known for public-key cryptography systems, and each such algorithm may be utilized in accordance with various embodiments herein. In one embodiment, a private key may be utilized to encrypt media signature 665. In another embodiment, a public key (e.g., public key 510 of FIG. 5) may be utilized to decrypt media signature 665. In one example, once media signature 665 is decrypted, it may be utilized, as discussed more fully below, to authenticate game assets media 640.

Figure 6C:
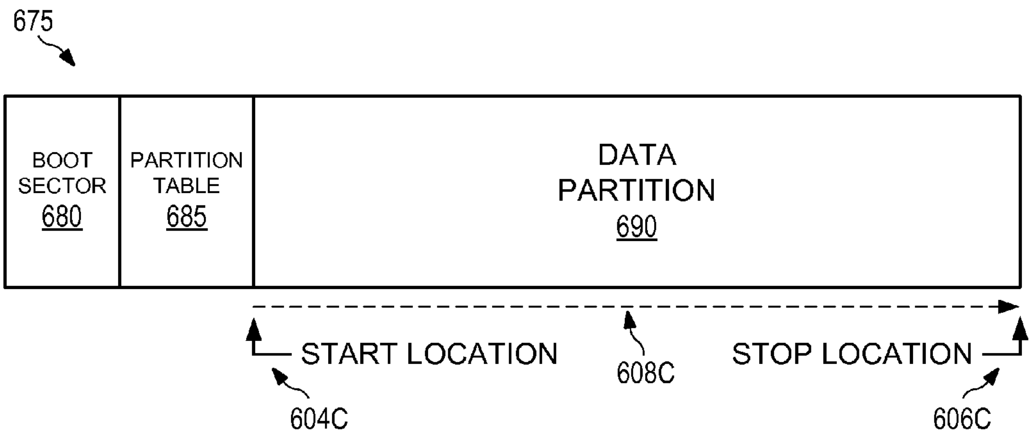
FIG. 6C is another diagram illustration of an exemplary memory layout, according to one embodiment.

FIG. 6C is a diagram illustration of an exemplary memory layout, according to one embodiment. In one embodiment, FIG. 6C may be the layout of Public Key Update Medium 675 ("PKUM"). In a further embodiment, PKUM 675 may be a flash memory device. For example, PKUM 675 may be a compact flash ("CF") device. In another example, PKUM 675 may be a Solid State Drive ("SSD").

In another embodiment, PKUM 675 may be viewed as a continuous array of sectors. In one example, PKUM 675 may include at the front end a boot sector 680. Boot sector 680 may contain code which may allow a CPU to boot PKUM 675 and load the associated programming. PKUM 675 may then include partition table 685. Partition table 685 may include instructions for the allocation and/or identification of partitions within game assets media 640. PKUM 675 may next include a data partition 690. In one embodiment, data partition 690 may be mostly unused space. In another embodiment, data partition 690 may include a public key. For example, a public key associated with a gaming system (e.g., public key 510 of FIG. 5) may require replacement, and data partition 690 may include such replacement public key.

Figure 6D:
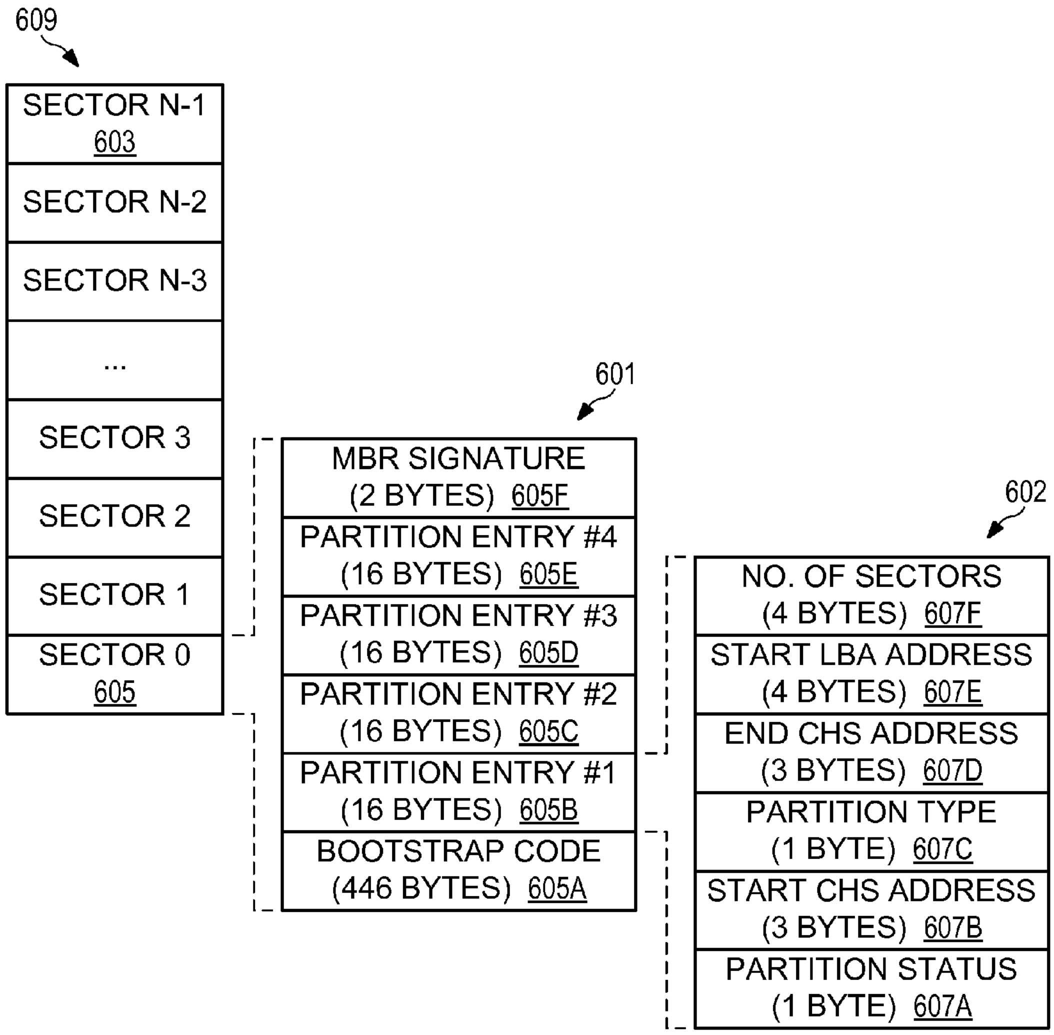
FIG. 6D is another diagram illustration of an exemplary memory layout, according to one embodiment.

FIG. 6D is another diagram illustration of an exemplary memory layout, according to one embodiment.

Figure 7:
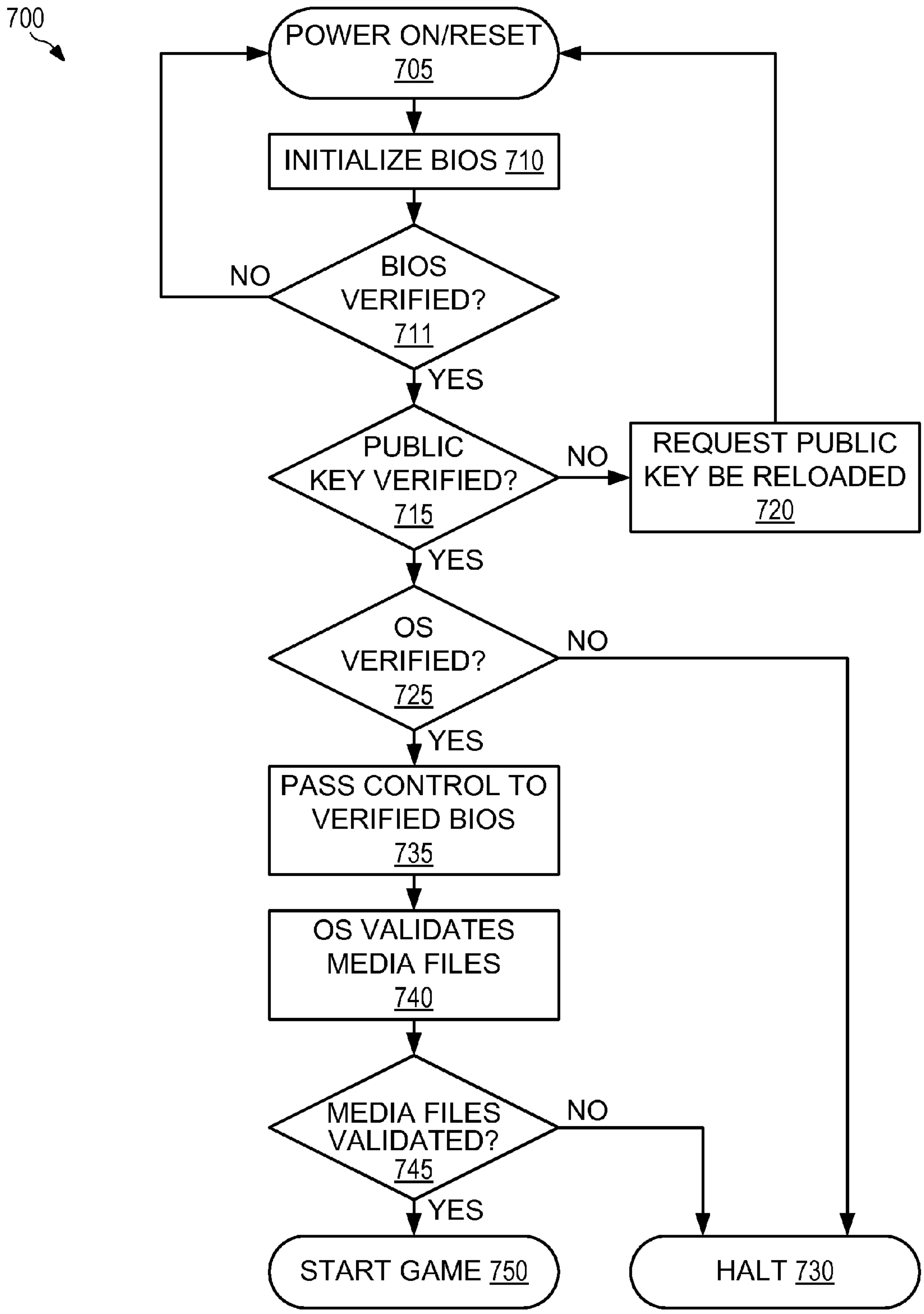
FIG. 7 is a flow diagram for ROM-based media validation, according to one embodiment.

FIG. 7 is a flow diagram for ROM-based media validation, according to one embodiment. Specifically, FIG. 7 generally illustrates a shared authentication process 700. In one embodiment, shared authentication process 700 begins with a power on and/or reset action, which may cause a gaming system to boot up (step 705).

In one embodiment, a next step may be to initialize the BIOS (step 710). In one embodiment, initializing the BIOS causes error-detecting code to be run on data contained on an association ROM, which may determine that there are no errors and the boot process may continue. For example, a cyclic redundancy check ("CRC") may be initiated and run for an associated ROM. In another embodiment, initializing the BIOS may also check associated BIOS extensions for any errors. In a further embodiment, initializing the BIOS may also initialize and/or configure hardware associated with the gaming system.

At step 715, an associated public key is verified. In one embodiment, an associated BIOS causes the public key to be verified. In another embodiment, an associated BIOS extension causes the public key to be verified. In a further embodiment, the public key is checked to see if it has been corrupted. For example, if it was determined that an encrypted media signature of an associated OS medium could not be properly decrypted with the provided public key, step 715 may fail.

If an associated public key is not verified at step 715, a request for the public key to be reloaded is generated at step 720. In one embodiment, such a request may be caused to be displayed on an associated display device. In another embodiment, such a public key that is similar and/or the same as a prior public key may be reloaded. In a further embodiment, a different public key may be loaded. In one embodiment, the reloading of a public key is done via PKUM 675. For example, if a public key was not verified at step 715, a request for a reloading of a public key may be generated at step 720, which may cause an operator to insert into, and/or otherwise place in communication with, a gaming system and/or PKUM 675 which may contain a new and/or otherwise uncorrupted public key. Once a public key has been reloaded at step 720, shared authentication process 700 may return to step 705 and reboot.

If the public key is verified at step 715, shared authentication process 700 may then attempt to verify the OS at step 725. In one embodiment, the BIOS causes the check of the OS at step 725. In another embodiment, a BIOS extension causes the check of the OS at step 725. In one embodiment, and as discussed more fully below, a gaming system may utilize a verified public key and a media signature of an associated OS medium to verify the OS at step 725. If the OS cannot be verified at step 725, shared authentication process 700 may proceed to step 730 where it may halt and prevent the gaming system from further booting and/or starting. In one embodiment (not shown), if the OS is validated at step 725, the OS is then loaded. For example, the BIOS may proceed to load the OS. In another example, a BIOS extension may pass control back to the BIOS to load the OS.

If the OS is validated at step 725, control may be passed to the verified OS at step 735. In one embodiment, control may be passed from the BIOS. In another embodiment, control may be passed from a BIOS extension. In one embodiment, the OS is configured to validate associated media files at step 740. It is contemplated that passing control to a verified OS to validate associated media files may maintain security while also expediting the remainder of the verification process. For example, the OS may be configured to utilize Direct Memory Access ("DMA") and/or read-ahead buffering techniques, which may allow it to check associated media files much faster than the BIOS and/or a BIOS extension, could check the associated media files. It is contemplated that such shared authentication may provide significant benefits, by expediting the boot and/or authentication process, and/or by freeing up the BIOS to perform other tasks.

At step 745, it is determined whether the media files have been validated. In one embodiment, the media files are validated in a similar manner that the OS was verified at step 725, and discussed more fully below. For example, a same and/or similar public key that was utilized to verify the OS may be used to verify the media files. In another embodiment, the media files are validated through use of a different methodology.

If one or more media files are not validated at step 745, shared authentication process 700 may proceed to step 730 where it may halt and prevent the gaming system from starting. If the media files are validated at step 745, shared authentication process 700 may proceed to step 750, where the game is allowed start.

Figure 8:
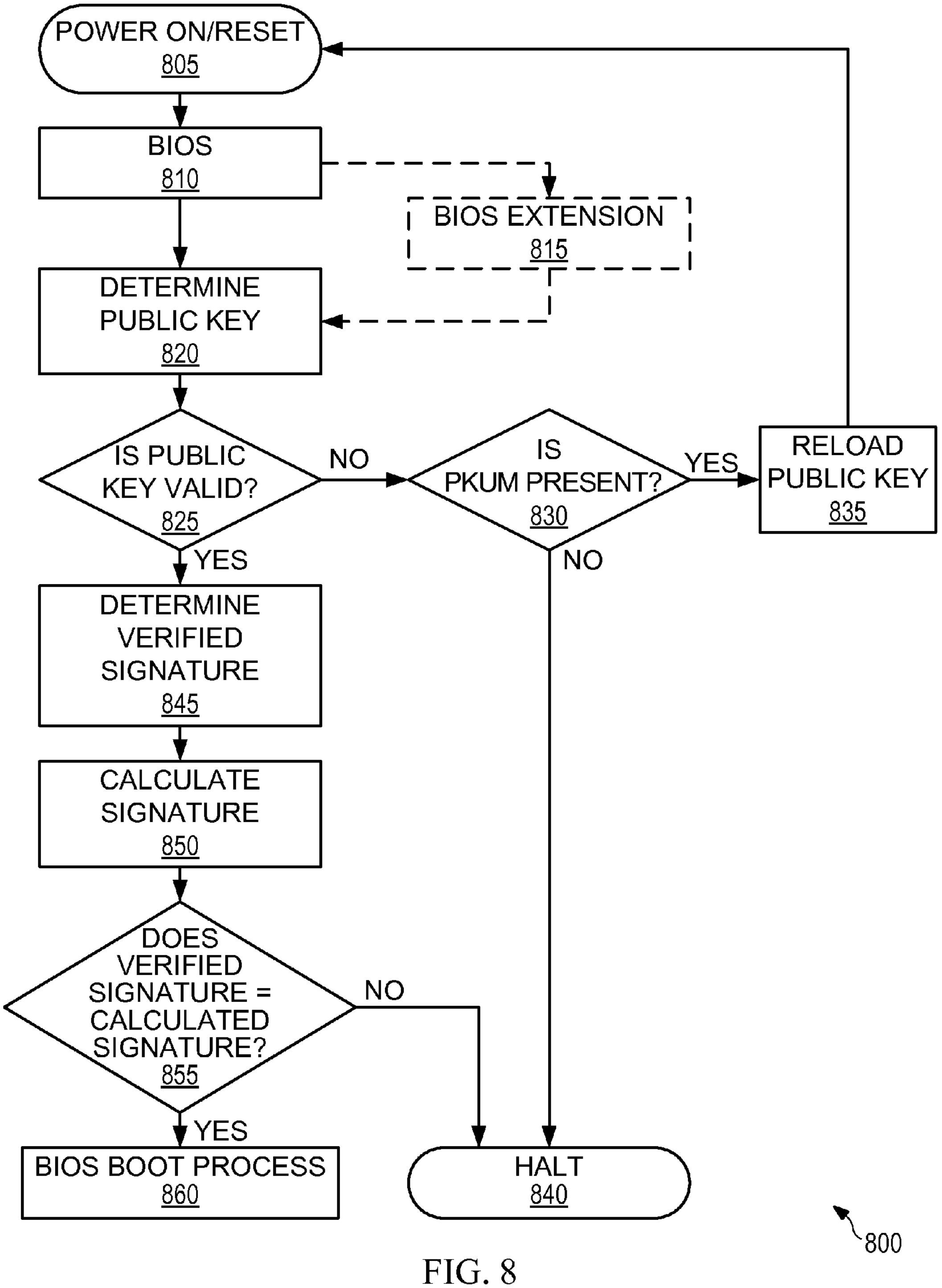
FIG. 8 is another flow diagram for ROM-based media validation, according to one embodiment.

FIG. 8 is another flow diagram for ROM-based media validation, according to one embodiment. Specifically, FIG. 8 generally illustrates an OS authentication process 800. In one embodiment, OS authentication process 800 begins with a power on and/or reset action 805, which may cause a gaming system to boot up.

In one embodiment, a next step may be to initialize the BIOS (step 810). In one embodiment, initializing the BIOS causes error-detecting code to be run on data contained on an association ROM, which may determine that there are no errors and the boot process may continue. For example, a cyclic redundancy check ("CRC") may be initiated and run for an associated ROM. In a further embodiment, initializing the BIOS may also initialize and/or configure hardware associated with the gaming system.

In another embodiment, initializing the BIOS may also check associated BIOS extensions for any errors and may then pass control to the BIOS extension at step 815. In this example, step 815 is shown in dashed form to illustrate that this may be the process for certain embodiments. It is contemplated that it may be particularly beneficial to pass control of certain authentication procedures to a BIOS extension, as then the procedures may be customized for a particular application without having to reconfigure the BIOS code, which may be time consuming and/or cause unintended consequences.

In one embodiment, it is contemplated that there may be particular advantages to utilizing a BIOS extension and/or implementing a sector-by-sector authentication procedures. For example, a manifest file and/or file-system logic may not need to reside within the BIOS and/or an associated BIOS extension. In another example, a gaming manufacturer may be able to utilize the same BIOS for all jurisdictions, and they may only need to add a BIOS extension for those jurisdictions that require authentication. In a further example, by utilizing a BIOS extension, the BIOS file size can be maintained, which may help with hardware limitations.

The next step in the OS authentication process 800 may be to determine the public key at step 820. In one embodiment, this may be done by accessing the public key from an associated memory device. For example, an associated SRAM may store the public key.

At step 825, it may be determined if the public key is valid. In one embodiment, the public key is checked to see if it has been corrupted. For example, if it was determined that an encrypted media signature of an associated OS medium could not be properly decrypted with the provided public key, step 825 may fail.

If the public key is determined not valid and/or otherwise corrupted at step 825, OS authentication process 800 may then determine if PKUM 675 is present at step 830. In one embodiment (not shown), the system may cause an associated display device to display a message to load and/or otherwise place in communication with the gaming system PKUM 675. If the system determines that no PKUM 675 is present at step 830, OS authentication process 800 may proceed to step 840 and halt further operations, which may prevent the gaming system from allowing game play.

Once PKUM 675 has been placed in communication with the gaming system, and/or once it has been determined that PKUM 675 is present, OS authentication process may continue to step 835 and reloads the public key. In one embodiment, the reloaded public key may be a new public key. In another embodiment, the reloaded public key may be an identical copy of a previous public key that existed on the gaming system. In a further embodiment, a reloaded public key may amend part of the previously loaded public key. Once a public key has been reloaded at step 835, OS authentication process 800 may return to the beginning step at 805 and reboot.

If at step 825, the public key is determined to be valid, OS authentication process 800 may proceed to step 845 and determine a verified signature. In one embodiment, the validated public key may be utilized to decrypt a media signature from an associated OS medium (e.g., FIG. 6A). In another embodiment, the BIOS and/or BIOS extension may determine the size of the OS Medium, and may then load the sector configured to store the media signature (e.g., the last sector). In one embodiment, the decrypted media signature may include a verified medium signature.

At step 850, which may occur before, simultaneously with, and/or after step 845, a signature is calculated. In one embodiment, the validated public key may be utilized to decrypt a media signature from an associated OS medium (e.g., FIG. 6A). In another embodiment, the decrypted media signature may include a verification range. For example, the decrypted media signature may include at least one sector beginning point and at least one sector ending point of the associated OS medium that, when hashed with an appropriate cryptographic hashing function (e.g., a Secure Hashing Algorithm ("SHA")) will generate a unique signature. In another embodiment, the decrypted media signature may also include the cryptographic hashing function to apply to the verification range. In another embodiment, the cryptographic hashing function may be pre-loaded and/or otherwise standardized for use on the gaming system. In one embodiment, the BIOS and/or a BIOS extension then may utilize the appropriate cryptographic hashing function to create a hash from the identified verification sector range and/or ranges, which may generate a calculated signature. In one embodiment, it may be particularly beneficial to locate a media signature (e.g., media signature 630 of FIG. 6A) distinct from other sectors (e.g., OS partition 620 of FIG. 6A). For example, this may allow the OS medium to run on a gaming system that is not configured to validate the OS medium. In another example, a gaming manufacturer may be able to utilize identical OS mediums in jurisdictions that require and/or do not require authentication of the OS medium. In one such example, the gaming manufacturer may only need to include BIOS and/or a BIOS extension that is configured to validate the OS medium for those jurisdictions that require such actions. It is readily apparent that this may be beneficial for operational flexibility.

At step 855, the verified signature from step 845 is compared to the calculated signature from step 850 to determine if they match. It should be apparent that the verified signature is generated from the OS medium as the OS medium is intended to be distributed by the gaming system manufacturer, and that a different and/or altered OS medium inserted into a gaming system may cause a different signature to be generated as the different and/or altered OS medium which will not have the identical partitions and/or sectors of code stored at the identical range(s) of the medium. In this manner, it is contemplated that such a verification check may prevent unauthorized OS implementations.

If the signatures do not match at step 855, then OS authentication process 800 may proceed to step 840, and halt the gaming system from running and/or halting game play. If the signatures do match at step 855, then OS authentication process 800 may proceed to step 860 and allow the BIOS to continue with the boot process. In one embodiment, the BIOS may pass control of part or all of the remaining boot process to another process. For example, BIOS may pass off control to a BIOS extension. In another example, BIOS may pass control to the verified OS, which may then proceed with part or all of the remaining boot process.

Figure 9:
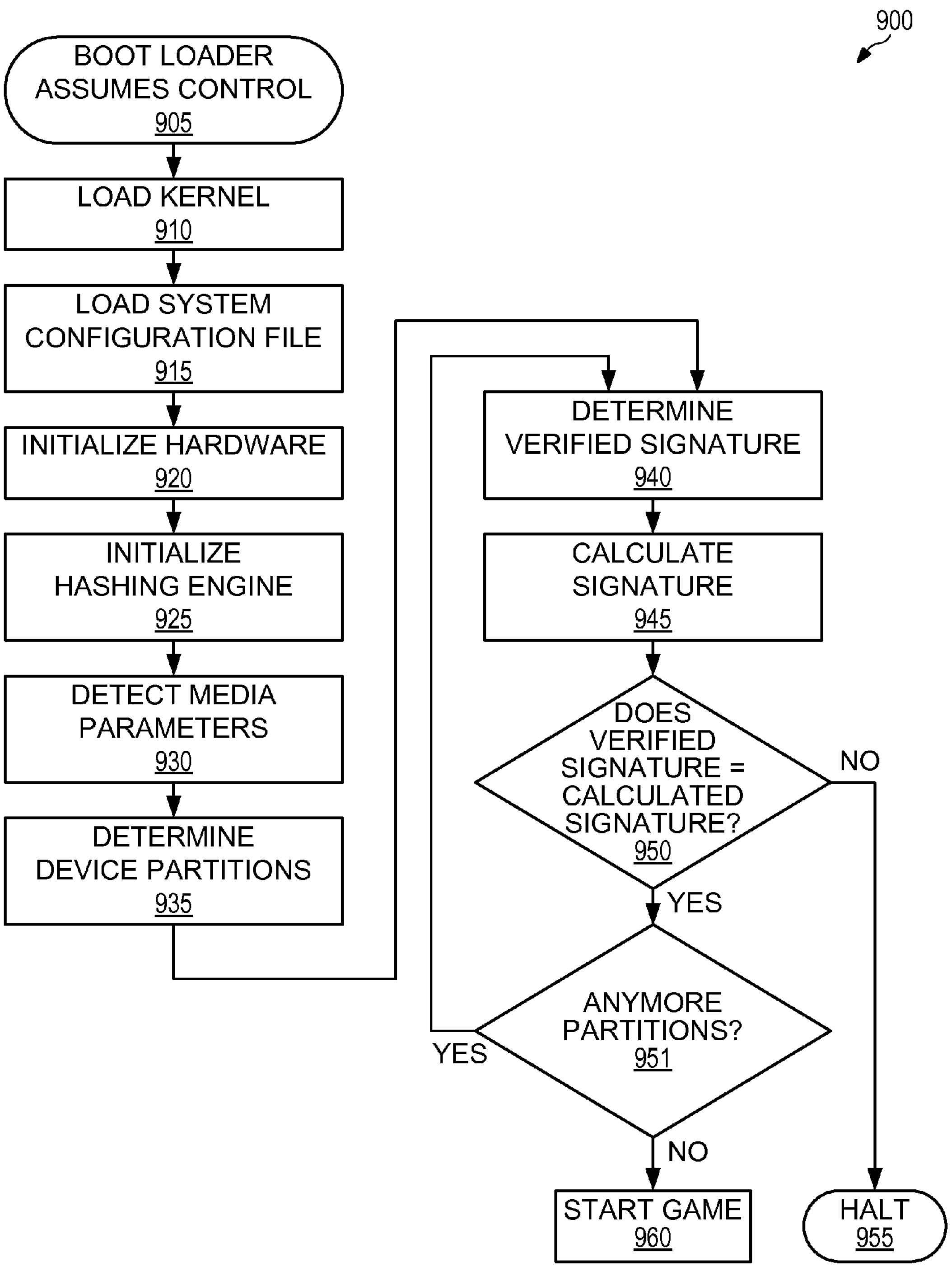
FIG. 9 is another flow diagram for ROM-based media validation, according to one embodiment.

FIG. 9 is another flow diagram for ROM-based media validation, according to one embodiment. Specifically, FIG. 9 generally illustrates a media authentication process 900. In one embodiment, media authentication process 900 may be utilized to validate an associated OS medium. In another embodiment, media authentication process 900 may be utilized to validate game and assets media. In a further embodiment, media authentication process may be utilized to validate other media associated with a gaming system.

In one embodiment, media authentication process 900 may begin at step 905 when a boot loader assumes control of the validation process. In one embodiment, the BIOS may pass control to the boot loader. In another embodiment, control may be passed to the boot loader after the OS has been authenticated. In a further embodiment, the boot loader may comprise part of the BIOS. In still another embodiment, the boot loader may comprise part of a BIOS extension. In a further embodiment, the boot loader may be stored on a separate memory device from the BIOS and/or BIOS extension. In one embodiment, the boot loader may load other data and/or programs which may then be executed from RAM.

At step 910, the boot loader may load the kernel from an associated boot partition. In one embodiment, the boot loader will then jump to the kernel entry point. In another embodiment, the loaded kernel may manage the communication between various software and hardware components. In a further embodiment, the loaded kernel may assume control of the remaining boot process. In another embodiment, the loaded kernel may assume control of the remaining validation processes.

At step 915, the kernel may initialize one or more hardware components. In one embodiment, the kernel may then load a system configuration file at step 920. It is contemplated that part of the system configuration file may include one or more scripts which are configured to validate one or more media. In one embodiment, the one or more scripts which are configured to validate one or more media are configured to be the last scripts to be executed by the system configuration file. In another embodiment, the one or more scripts which are configured to validate one or more media are configured to be the first script to be executed by the system configuration file. In a further embodiment, the one or more scripts which are configured to validate one or more media are configured to be one of the last scripts to be executed by the system configuration file.

In one embodiment, steps 925 through 950 may be part of one or more scripts which are configured to validate one or more media. At step 925, a hashing engine may be initialized. In one embodiment, such initialized hashing engine may control one or more of the following steps of FIG. 9.

At step 930, media authentication process 900 may proceed to detect one or more parameters for one or more associated media. In one embodiment, the initialized hashing engine controls such detection. In another embodiment, media authentication process 900 may cause parameters to be detected for all present media. In another embodiment, media authentication process 900 may cause parameters to be detected for media other than the OS medium. For example, it may be that the OS medium has already been verified before media authentication process 900 is implemented, therefor there would not be a need to repeat such authentication.

At step 935, media authentication process 900 may proceed to determine partition locations of one or more associated media devices. In one embodiment, the determination of partition locations may also determine the locations of one or more associated sectors. In a further embodiment, the initialized hashing engine controls such detection. In another embodiment, media authentication process 900 may cause partition locations to be determined for all present media. In another embodiment, media authentication process 900 may cause partition locations to be determined for media other than the OS medium. For example, it may be that the OS medium has already been verified before media authentication process 900 is implemented, therefor there would not be a need to repeat such authentication.

At step 940, media authentication process 900 may determine the verified signatures for one or more associated media. In one embodiment, the initialized hashing engine may control such determination. In another embodiment, a public key (e.g., public key 510 of FIG. 5) may be utilized to decrypt a media signature (e.g., media signature 665 of FIG. 6B). In one example, the decrypted media signature may include a verified signature for that media.

At step 945, media authentication process 900 may proceed to calculate a signature. It is contemplated that step 945 can occur before, after, and/or simultaneous with step 940. In another embodiment, a public key (e.g., public key 510 of FIG. 5) may be utilized to decrypt a media signature (e.g., media signature 665 of FIG. 6B). In one example, the decrypted media signature may include at least one beginning sector point and at least one sector ending point which may be utilized to reproduce part and/or all of the verified signature. In a further example, the decrypted media signature may include a cryptographic hashing function, (e.g., a SHA). In a further example, the decrypted media signature may include an identification of a cryptographic hashing function, (e.g., a SHA) that should be utilized, and which may need to be loaded from elsewhere within the gaming system. In another example, utilizing a cryptographic hashing function from the decrypted media signature to hash the sector and/or sectors of the associated media delineated by the identified at least one beginning and/or ending sector points may reproduce an exact replica of the verified signature.

At step 950, the verified signature from step 940 is compared to the calculated signature from step 945 to determine if they match. It should be apparent that the verified signature is generated from the media as the media is intended to be distributed by the gaming system manufacturer, and that a different and/or altered media inserted into a gaming system may cause a different signature to be generated as the different and/or altered media which will not have the identical partitions and/or sectors of code stored at the identical range (s) of the media. In this manner, it is contemplated that such a verification check may prevent unauthorized media implementations.

If the signatures do not match at step 950, then media authentication process 900 may proceed to step 955, and halt the gaming system from running and/or halting game play. If the signatures do match at step 950, then media authentication process 900 may proceed to step 960 and allow the game to start.

Figure 10:
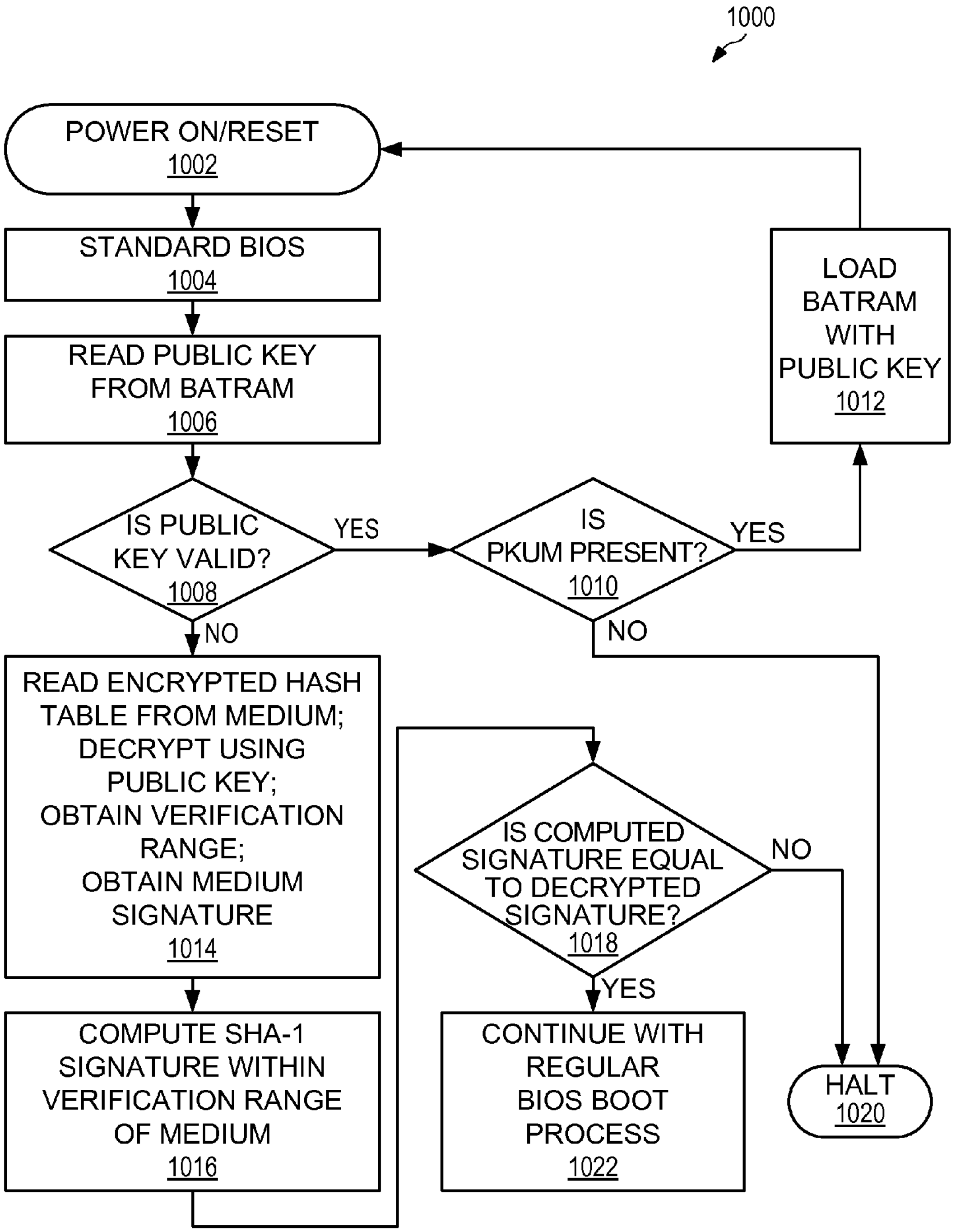
FIG. 10 is another flow diagram for ROM-based media validation, according to one embodiment.

In FIG. 10, a flow diagram for ROM-based media validation is shown, according to one embodiment. The method may include a powering on and/or a reset step (step 1002). The method may include implementing a standard BIOS (step 1004). The method may include reading a public key from BATRAM (step 1006). The method may include determining whether the public key is valid (step 1008). If the public key is invalid, then the method may determine whether the PKUM is present (step 1010). If the PKUM is not present, then the method may halt (step 1020). If the PKUM is present, then the method may include loading the BATRAM with the public key (step 1012) and then the method moves back to step 1002. If the public key is valid, then the method may include reading encrypted hash table from medium, decrypting using the public key, obtaining verification range, and/or obtaining medium signatures (step 1014). The method may include computing SHA-1 signature (or other similar signature(s)) within the verification range of medium (step 1016). The method may include determining whether the computed signature is equal to the decrypted signature (step 1018). If the computed signature is not equal to the decrypted signature, then the method may halt (step 1020). If the computed signature is equal to the decrypted signature, then the method may continue with regular BIOS boot process (step 1022). The method may include one or more signatures and/or any other elements.

In one example, a method of implementing the required software chain-of-trust using a motherboard. In one example, the systems, devices, and/or methods of this disclosure may be utilized in jurisdictions that have the requirements that a verifiable link from the authentication system to a conventional ROM device. In these jurisdictions there should be an unbroken chain of trust beginning from the BIOS chips all the way to the game executable. In one example, a devise may utilize a custom BIOS that can perform media authentication before even the OS is loaded. In one example, the authentication algorithm utilized may be compatible with these limitations of the motherboard currently in use (e.g., the iBase CJ-2009B). In one example, the CJ-2009B motherboard only provides enough address lines for a 2 MB ROM to the ROM socket. This limitation may prevent the use of the Linux kernel being placed in the ROM chip, as well as having any sort of complex file-system-based authentication. However, other systems may be utilized to overcome this limitation.

In one example, the ROM address space limitation may be more limiting because the BIOS itself already uses 1 MB or half of the total space available. That means the authentication algorithm must be small and efficient. In one example, it would not be possible to fit a file-by-file verification algorithm because that would require file-system logic in the BIOS, which requires fitting an OS with initialization routines and a kernel in just under 1 MB.

In one example, the system and/or method may be sector I/O based. In one example, by using the sector I/O routines already available in the BIOS, a BIOS extension may be utilized. This BIOS extension may read each used sector of the boot-able OS medium and produce a calculated signature. This signature may then be compared with a known good signature (e.g., reference signature). If the signatures match, then control may be passed back to the BIOS, and it proceeds to load the boot sector from disk. If the signatures do not match, then the method may halt execution and notifies the user that the medium is invalid. In one example, if the one or more signatures are stored in the BIOS ROM chip, then it would be necessary to replace it for each software media update, which is undesirable and costly. In another example, if the raw one or more signatures are stored in the medium itself however, then it would become a threat that one or more potential perpetrators finds the one or more signatures and change the medium. However, since storing the one or more signatures in the medium itself gives us the most operational flexibility, we must find a way to obscure the signature. In one example, an Asymmetric Key Encryption ("AKE") algorithm can be used to achieve this. For the security purposes, when generating a media set, each signature would be encrypted using a Private Key. Since the Private Key is only known to a few authorized individuals in the company, security is increased.

When the Private Key is generated, a Public Key is also produced. The Public Key is related to the Private Key in such a way that the medium signature can be decrypted using the Public Key, but the Private Key is needed for encryption. The Public Key can be widely known, without affecting security.

In one example, once the medium signature is encrypted, the method will need to access the Public Key in order to decrypt it. The Public Key could be stored in ROM, but if the Private Key ever gets compromised, the BIOS and the media in all EPS's in the field would have to be replaced, which is a very costly operation. In another example, the storing of the Public Key in a media that can be updated provides various benefits. The Battery-Backed PCI SRAM (BATRAM) found in the CJ-2009B motherboard is a medium that can be utilized for this purpose. In one example, if the Private Key ever gets compromised, only the media in the EPS's need be replaced. The BIOS extension will detect that the signature could not be decrypted correctly and will ask the operator to insert a Public Key Update Medium ("PKUM") in the correct slot and reboot the EPS. Upon reboot, the BIOS extension will detect the PKUM and proceed to update the BATRAM and reboot again. In another example, another aspect that must be kept in mind: the amount of time it takes to validate the entire media set using the BIOS sector logic alone can be excessive. It is better to just check the used space in the OS medium first, and then pass control to the already-validated OS.

In one example, once initialized, the OS can start a Media Validation ("MeV") program. The MeV's function is to validate the remaining media using the OS's sector access logic, which uses DMA and read-ahead buffering techniques. This enables the medium checking to be performed much faster than the BIOS Programmed-I/O ("PIO") method. In one example, to avoid checking the entire medium contents, the BIOS extension can be given the starting and ending sector range. This information may also need to be encrypted for security purposes. It can be stored in a "C" language structure together with the medium signature. The whole structure may then be encrypted and stored in the last sector of the medium.

In various examples, .TEXT, .DATA, .BSS, .RODATA, and/or any other language structure may be utilized with any of the systems, devices, and/or method in this disclosure. In various examples, software, firmware, memory storage elements, and/or another other device may be utilized. In various examples, one or more cards may be utilized.

In one example, storing the public key in BATRAM allow for significant flexibility in security management. If the private key ever gets compromised, a BIOS update will not be necessary to change the public key installed in each EPS. In another example, by using the existing BIOS sector I/O logic through a BIOS extension, the system, device and/or method can implement the security requirements for one or more jurisdictions within the limitations of the CJ-2009B motherboard. In another example, the OS media can run with or without the Secure BIOS, thus maximizing operational flexibility. In another example, media verification is performed in a sector I/O basis, thus no manifest file or file-system logic is required to reside in the BIOS.

In another example, the system ROM may be the home for the BIOS and the BIOS extension. The BATRAM may be used to store not only the public key, but also persistent game data, according to one embodiment. In one example, the PKUM is usually not connected to the EPS, except in case of public key corruption. In one example, the game and assets media might be split between one or more media. In another example, the OS Medium may be contained in a single device.

In one example, the media used with the EPS's are all of the Flash memory type, which will be either a CompactFlash (CF) card and/or a Solid State Drive (SSD). In one example, these media can be viewed as a continuous array of sectors. In one example, the internal controller on each device may make sure that any bad sectors in the flash memory array are replaced by a known-good sector from an over-provision pool of good sectors.

In one example, the Media Signature structure is located in the last sector of the medium. Here is it's "C" representation:

```
typedef struct MEDIA_BLK
{
uint8_t      Message_Digest[ SHA1_HASH_SIZE ];
uint32_t     StartLoc;
uint32_t     StopLoc;
} MEDIA_BLK_t;
```

In this example, there is no boot partition. In one example, the Boot sector and the partition table remain in their positions for correct media configuration. In one example, the Game Executables are on different media, but the basic layout will remain the same. In another example, in the PKUM, there will be only one partition. It will have only one file, which will contain the Public Key. This file is read by the BIOS extension and placed in the BATRAM. In one example, this only occurs when the BIOS extension finds that the Public Key has been corrupted In one example, the BIOS initializes as usual, performing a CRC-16 check of the entire ROM contents before executing (that includes the BIOS extension. After the BIOS has initialized and configured the hardware, it passes control to the BIOS extension. In one example, the BIOS then reads the Public key from BATRAM. If the Public Key is not corrupted, it proceeds to check the OS medium. If the Public Key is corrupted, then BIOS extension will attempt to load the Public Key from the PKUM. If it is not present, BIOS extension may display a message on the screen requesting the operator to insert the PKUM device in the correct slot and reboot. In this case BIOS extension may halt further execution and the operator may have to recycle power.

Upon determination that the Public Key is valid, the BIOS extension proceeds to check the OS Medium. BIOS extension may determine the size of the OS Medium and then load the load the last sector. This contains the MEDIA_BLK structure discussed above. From this structure BIOS extension may find the range of sectors to check and the known-good signature of the medium.

In one example, BIOS extension may then perform a SHA-1 signature of all sectors within the designated range and then compare the calculated signature with the one stored in the MEDIA_BLK structure. If the signatures are identical, then BIOS extension returns control to the BIOS and the boot process continues as normal: the boot sector is loaded; control is passed to the Boot-Loader, which then loads the kernel and executes it.

In one example, if the signatures do not match, the BIOS extension will present a message to the operator reporting the error and then halt execution, to prevent the loading of malicious software. After the BIOS is done with the validation of OS CF, it will try to load the boot-loader. The BIOS then passes control to the boot-loader, which loads the kernel from the boot partition. The boot-loader will then jump to the kernel entry point. The kernel will initialize the hardware and then load the initial program, which starts the system configuration. MeV will be invoked at the end of the system configuration phase. A script named "MeV.start" will be placed under /etc/local.d for this purpose.

In one example, MeV will initialize the hashing engine and then try to detect the parameters for all present media. Next, MeV will search which device contains which partitions. MeV will ignore the root and boot partitions, since they have been checked by the BIOS previously. The MeV validation process will be very similar to what the BIOS does, only much faster. MeV will check the Player CF first, and then the Assets CF. The game shall not be started before the completion of the validation process. MeV will open the device file for the corresponding media (e.g. /dev/sdb) and then MeV will read the start and stop sector numbers as given in the MEDIA_BLK_t structure above, located in the next to last sector. It will then start reading blocks of sectors from the StartLoc sector up to StopLoc sector into memory. MeV will calculate the SHA-1 of that block, load the next block and continue until done with the partition verification. If the Player CF partition verifies correctly, MeV will proceed to check the Assets CF. If any partition fails verification, MeV will display a message on the screen warning the operator if a mismatch has been found, and then hang the system. This will prevent the system from being started with any malicious software.

Figure 11:
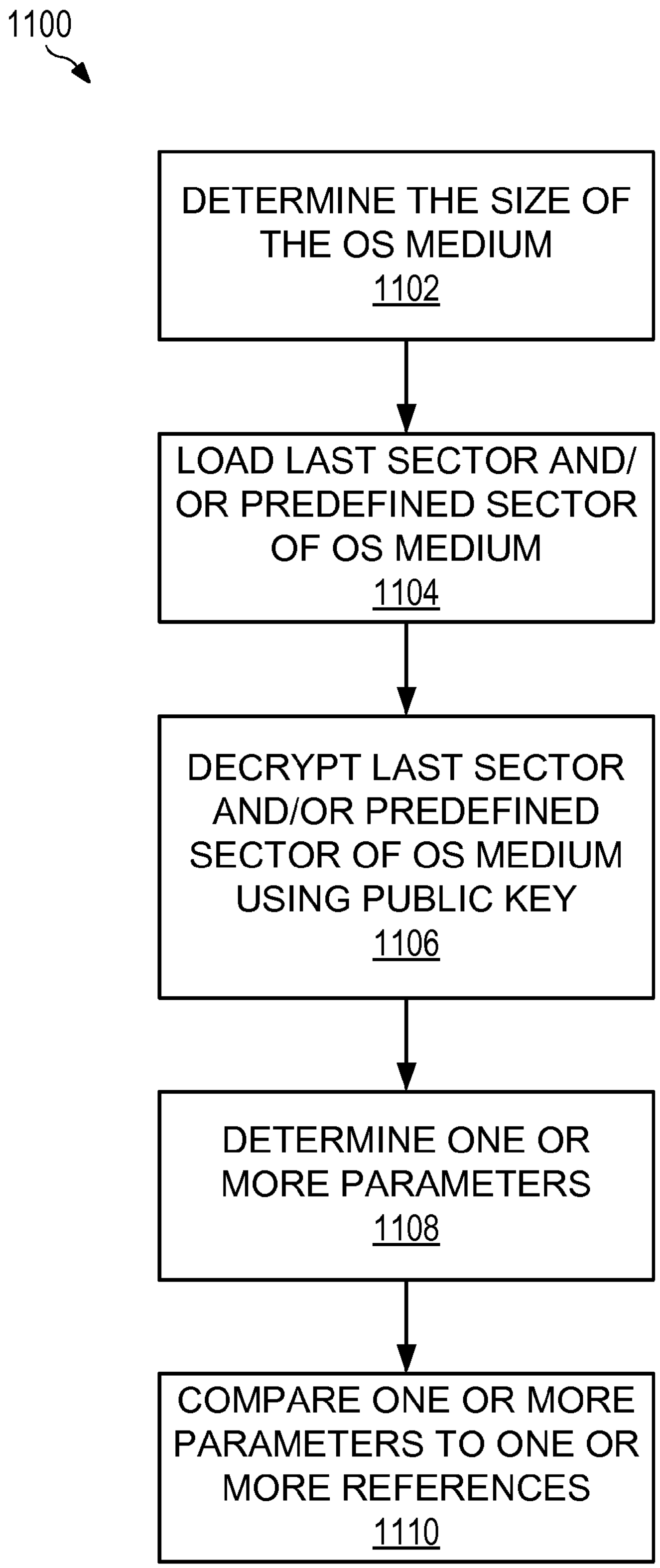
FIG. 11 is another flow diagram for ROM-based media validation, according to one embodiment.

In FIG. 11, a flow diagram for ROM-based media validation is shown, according to one embodiment. The method may include determining the size of the OS medium (step 1102). The method may include loading the last sector and/or one or more predefined sectors of the OS medium (step 1104). The method may include decrypting the last sector and/or one or more predefined sectors of the OS medium using the public key (step 1106). The method may include determining one or more parameters (step 1108). The method may include comparing the one or more parameters to one or more references (step 1110).

In an exemplary embodiment, the electronic gaming system may include one or more read-only memory devices. The one or more read-only memory devices may store a plurality of instructions. The electronic gaming system may include one or more read/write memory devices. The one or more read/write memory devices may store a first public key. The electronic gaming system may include an operating system medium. The operating system medium may store one or more of an operating system and one or more encrypted operating system medium signatures. The electronic gaming system may include one or more game assets media. The one or more game assets media may store one or more game asset files. The electronic gaming system may include a wager acceptor. The electronic gaming system may include one or more processors, which may receive the plurality of instructions, which when executed by the one or more processors, cause the one or more processors to operate with the one or more read/write memory devices, the operating system media, the one or more game assets media, and/or the wager acceptor to determine if the first public key is able to decrypt the encrypted operating system medium signature. If the first public key is not able to decrypt the encrypted operating system medium signature, the system and/or method may cause a display device to display a request to update the first public key and return to decrypt the encrypted operating system medium signature, determine a verified hash signature from the decrypted operating system medium signature, determine a verification range from the decrypted operating system medium signature, calculate a hash signature based on the verification range, and/or determine if the verified hash signature matches the calculated hash signature. If the verified hash signature does not match the calculated hash signature, the system and/or method may prevent the wager acceptor from accepting a wager. If the verified hash signature does match the calculated hash signature, the system and/or method may cause the one or more processors to receive a plurality of instructions from the operating system, which when executed by the one or more processors, cause the one or more processors to operate with the one or more read/write memory devices, the one or more operating system media, the one or more game assets media, and the wager acceptor to verify that the one or more game assets media is authentic. If the one or more game assets media is determined to not be authentic, the system and/or method may prevent the one or more game asset files from loading. If the one or more game assets media is determined to be authentic, thereafter allow the wager acceptor to accept a wager.

In another example, the one or more game assets media may further stores one or more encrypted game assets media signatures and the instructions received from the operating system cause the one or more processors to operate with the one or more read/write memory devices, the one or more operating system media, the one or more game assets media, and the wager acceptor to decrypt the one or more encrypted game assets media signatures, determine a verified game assets hash signature from the one or more decrypted game assets media signatures, determine a game assets verification range from the one or more decrypted game assets media signatures, calculate a game assets hash signature based on the game assets verification range, and/or determine if the game assets verified hash signature matches the game assets calculated hash signature. If the verified game assets hash signature does not match the calculated game assets hash signature, determine that the game assets media is not authentic. If the verified game assets hash signature does match the calculated game assets hash signature, determine that the game assets media is authentic.

In another example, the first public key decrypts the encrypted game assets media signature. In another example, at least a part of the plurality of instructions are from a BIOS extension stored on the at least one read-only memory device. In another example, at least a part of the plurality of instructions are from a BIOS stored on the at least one read-only memory device. In another example, the one or more processors may receive instructions from a public key update medium which when executed by the at least one processor, cause the one or more processors to update the first public key. In another example, the updating of the first public key comprises replacing the first public key with a second public key. In another example, the calculating of the hash signature based on the verification range may include determining a first sector and a second sector from the verification range, locating the first sector on the operating system medium, locating the second sector on the operating system medium, determining a block of sectors from the first sector to the second sector, and/or applying a cryptographic hashing function to the determined block of sectors.

In one embodiment, the electronic gaming system may include at least one read-only memory device where the at least one read-only memory device stores a BIOS and a BIOS extension, at least one read/write memory device, where the at least one read/write memory device stores a first public key, an operating system medium, where the operating system medium may store one or more of an operating system. The electronic gaming system may include an encrypted operating system medium signature, at least one processor which may receive a first plurality of instructions from the BIOS, which when executed by the at least one processor, cause the at least one processor to operate with the at least one read/write memory device, the operating system media, and the wager acceptor to begin a gaming system boot process, receive a plurality of instructions from the BIOS extension, which when executed by the at least one processor, cause the at least one processor to operate with the at least one read/write memory device, the operating system media, and the wager acceptor to determine if the first public key is able to decrypt the encrypted operating system medium signature. If the first public key is not able to decrypt the encrypted operating system medium signature, the system and/or method may cause a display device to display a request to update the first public key and return to decrypt the encrypted operating system medium signature, determine a verified hash signature from the decrypted operating system medium signature, determine a verification range from the decrypted operating system medium signature, calculate a hash signature based on the verification range, determine if the verified hash signature matches the calculated hash signature. If the verified hash signature does not match the calculated hash signature, the system and/or method may prevent the gaming system boot process from completing. If the verified hash signature does match the calculated hash signature, the system and/or method may cause the at least one processor to receive a second plurality of instructions from the BIOS and complete the gaming system boot process based on the second plurality of instructions from the BIOS.

In another example, the at least one processor may receive instructions from a public key update medium which when executed by the at least one processor, cause the at least one processor to update the first public key. In another example, the updating of the first public key comprises replacing the first public key with a second public key. In another example, the calculating of the hash signature based on the verification range may include determining a first sector and a second sector from the verification range, locating the first sector on the operating system medium, locating the second sector on the operating system medium, determining a block of sectors from the first sector to the second sector, and/or applying a cryptographic hashing function to the determined block of sectors. In another example, the electronic gaming system may include at least one game assets media, where the at least one game assets media stores at least one game asset file and an encrypted game asset media signature.

In another example, the at least one processor may receive a plurality of instructions from the operating system, which when executed by the at least one processor, cause the at least one processor to operate with the at least one read/write memory device, the operating system media, and the at least one game assets media to decrypt the encrypted game assets media signature, determine a verified game assets hash signature from the decrypted game assets media signature, determine a game assets verification range from the decrypted game assets media signature, calculate a game assets hash signature based on the game assets verification range, and/or determine if the game assets verified hash signature matches the game assets calculated hash signature. If the verified game assets hash signature does not match the calculated game assets hash signature, the system and/or method may determine that the game assets media is not authentic. If the verified game assets hash signature does match the calculated game assets hash signature, the system and/or method may determine that the game assets media is authentic.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system may be powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system may be different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming system comprising:

at least one read-only memory device, wherein said at least one read-only memory device stores a plurality of instructions;

at least one read/write memory device, wherein said at least one read/write memory device stores a first public key;

an operating system medium, wherein said operating system medium stores:

i) an operating system; and ii) an encrypted operating system medium signature;

at least one game assets media, wherein said at least one game assets media stores at least one game asset file;

a wager acceptor; and at least one processor configured to receive the plurality of instructions, which when executed by the at least one processor, cause the at least one processor to operate with the at least one read/write memory device, the operating system media, the at least one game assets media, and the wager acceptor to:

(a) determine if the first public key is able to decrypt the encrypted operating system medium signature;

(b) if the first public key is not able to decrypt the encrypted operating system medium signature, cause a display device to display a request to update the first public key and return to (a);

(c) decrypt the encrypted operating system medium signature;

(d) determine a verified hash signature from the decrypted operating system medium signature;

(e) determine a verification range from the decrypted operating system medium signature;

(f) calculate a hash signature based on the verification range;

(g) determine if the verified hash signature matches the calculated hash signature;

(h) if the verified hash signature does not match the calculated hash signature, prevent the wager acceptor from accepting a wager; and (i) if the verified hash signature does match the calculated hash signature, cause the at least one processor to receive a plurality of instructions from the operating system, which when executed by the at least one processor, cause the at least one processor to operate with the at least one read/write memory device, the operating system media, the at least one game assets media, and the wager acceptor to:

a. verify that the at least one game assets media is authentic;

b. if the at least one game assets media is determined to not be authentic, prevent the at least one game asset file from loading; and c. if the at least one game assets media is determined to be authentic, thereafter allow the wager acceptor to accept a wager.

2. The electronic gaming system of claim 1, wherein:

said at least one game assets media further stores an encrypted game assets media signature; and said instructions received from the operating system cause the at least one processor to operate with the at least one read/write memory device, the operating system media, the at least one game assets media, and the wager acceptor to:

(a) decrypt the encrypted game assets media signature;
(b) determine a verified game assets hash signature from the decrypted game assets media signature;
(c) determine a game assets verification range from the decrypted game assets media signature;
(d) calculate a game assets hash signature based on the game assets verification range;
(e) determine if the game assets verified hash signature matches the game assets calculated hash signature;
(f) if the verified game assets hash signature does not match the calculated game assets hash signature, determine that the game assets media is not authentic; and
(g) if the verified game assets hash signature does match the calculated game assets hash signature, determine that the game assets media is authentic.

3. The electronic gaming system of claim 2, wherein the first public key decrypts the encrypted game assets media signature.

4. The electronic gaming system of claim 1, wherein at least a part of the plurality of instructions are from a BIOS extension stored on the at least one read-only memory device.

5. The electronic gaming system of claim 1, wherein at least a part of the plurality of instructions are from a BIOS stored on the at least one read-only memory device.

6. The electronic gaming system of claim 1, wherein the at least one processor is configured to receive instructions from a public key update medium which when executed by the at least one processor, cause the at least one processor to update the first public key.

7. The electronic gaming system of claim 6, wherein the updating of the first public key comprises replacing the first public key with a second public key.

8. The electronic gaming system of claim 1, wherein the calculating of the hash signature based on the verification range includes:

(a) determining a first sector and a second sector from the verification range;
(b) locating the first sector on the operating system medium;
(c) locating the second sector on the operating system medium;
(d) determining a block of sectors from the first sector to the second sector; and
(e) applying a cryptographic hashing function to the determined block of sectors.

9. An electronic gaming system comprising:

at least one read-only memory device, wherein said at least one read-only memory device stores a BIOS and a BIOS extension;
at least one read/write memory device, wherein said at least one read/write memory device stores a first public key;
an operating system medium, wherein said operating system medium stores:
i) an operating system; and
ii) an encrypted operating system medium signature;
at least one processor configured to receive a first plurality of instructions from the BIOS, which when executed by the at least one processor, cause the at least one processor to operate with the at least one read/write memory device, the operating system media, and the wager acceptor to:
(a) begin a gaming system boot process;
(b) receive a plurality of instructions from the BIOS extension, which when executed by the at least one processor, cause the at least one processor to operate with the at least one read/write memory device, the operating system media, and the wager acceptor to:
i) determine if the first public key is able to decrypt the encrypted operating system medium signature;
ii) if the first public key is not able to decrypt the encrypted operating system medium signature, cause a display device to display a request to update the first public key and return to (b);
iii) decrypt the encrypted operating system medium signature;
iv) determine a verified hash signature from the decrypted operating system medium signature;
v) determine a verification range from the decrypted operating system medium signature;
vi) calculate a hash signature based on the verification range;
vii) determine if the verified hash signature matches the calculated hash signature;
viii) if the verified hash signature does not match the calculated hash signature, prevent the gaming system boot process from completing; and
ix) if the verified hash signature does match the calculated hash signature, cause the at least one processor to receive a second plurality of instructions from the BIOS; and
x) complete the gaming system boot process based on the second plurality of instructions from the BIOS.

10. The electronic gaming system of claim 9, wherein the at least one processor is configured to receive instructions from a public key update medium which when executed by the at least one processor, cause the at least one processor to update the first public key.

11. The electronic gaming system of claim 10, wherein the updating of the first public key comprises replacing the first public key with a second public key.

12. The electronic gaming system of claim 9, wherein the calculating of the hash signature based on the verification range includes:

(a) determining a first sector and a second sector from the verification range;
(b) locating the first sector on the operating system medium;
(c) locating the second sector on the operating system medium;
(d) determining a block of sectors from the first sector to the second sector; and
(e) applying a cryptographic hashing function to the determined block of sectors.

13. The electronic gaming system of claim 9, further comprising at least one game assets media, wherein said at least one game assets media stores at least one game asset file and an encrypted game asset media signature.

14. The electronic gaming system of claim 13, wherein the at least one processor is further configured to receive a plurality of instructions from the operating system, which when executed by the at least one processor, cause the at least one processor to operate with the at least one read/write memory device, the operating system media, and the at least one game assets media to:

(a) decrypt the encrypted game assets media signature;
(b) determine a verified game assets hash signature from the decrypted game assets media signature;
(c) determine a game assets verification range from the decrypted game assets media signature;

(d) calculate a game assets hash signature based on the game assets verification range;

(e) determine if the game assets verified hash signature matches the game assets calculated hash signature;

(f) if the verified game assets hash signature does not match the calculated game assets hash signature, determine that the game assets media is not authentic; and (g) if the verified game assets hash signature does match the calculated game assets hash signature, determine that the game assets media is authentic.

* * * * *